US006510367B1

United States Patent
McQuinn

(10) Patent No.: US 6,510,367 B1
(45) Date of Patent: *Jan. 21, 2003

(54) DELAY COORDINATING SYSTEM FOR A SYSTEM OF OPERATIVELY COUPLED AGRICULTURAL MACHINES

(75) Inventor: Alvin E. McQuinn, Edina, MN (US)

(73) Assignee: Ag-Chem Equipment Co., Inc., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/165,251

(22) Filed: Oct. 1, 1998

Related U.S. Application Data

(63) Continuation-in-part of application No. 08/766,420, filed on Dec. 12, 1996, now Pat. No. 6,089,743.

(51) Int. Cl.⁷ .............................................. G06F 17/00
(52) U.S. Cl. ..................... 700/241; 700/240; 239/67; 239/69; 239/70; 239/159; 222/52; 222/129; 111/130; 111/903; 701/50; 701/217
(58) Field of Search ................................ 700/231, 240, 700/241, 46, 54; 239/69, 11, 61, 70, 67, 159, 155; 701/50, 207, 213, 217, 300; 222/52, 129; 111/130, 200, 903, 904

(56) References Cited

U.S. PATENT DOCUMENTS

| | | | | |
|---|---|---|---|---|
| 3,861,337 A | * | 1/1975 | Thompson | 111/1 |
| 4,239,010 A | * | 12/1980 | Amburn | 111/1 |
| 4,630,773 A | * | 12/1986 | Ortlip | 239/1 |
| 4,930,702 A | * | 6/1990 | Vanderjagt | 239/157 |
| 4,967,957 A | * | 11/1990 | Bachman | 239/62 |
| 5,134,961 A | * | 8/1992 | Giles et al. | 118/684 |
| 5,355,815 A | * | 10/1994 | Monson | 111/200 |
| 5,381,624 A | | 1/1995 | Davis et al. | 47/1.7 |
| 5,453,924 A | * | 9/1995 | Monson et al. | 364/131 |
| RE35,100 E | * | 11/1995 | Monson et al. | 111/130 |
| 5,574,657 A | * | 11/1996 | Tofte et al. | 364/510 |
| 5,704,546 A | * | 1/1998 | Henderson et al. | 239/1 |
| 5,742,914 A | * | 4/1998 | Hagenbuch | 701/35 |
| 5,913,915 A | * | 6/1999 | McQuinn | 701/50 |
| 5,915,313 A | * | 6/1999 | Bender et al. | 111/178 |
| 5,919,242 A | * | 7/1999 | Greatline et al. | 701/50 |
| 5,971,294 A | * | 10/1999 | Thompson et al. | 239/76 |
| 6,029,106 A | * | 2/2000 | Hale et al. | 701/50 |
| 6,089,743 A | * | 7/2000 | McQuinn | 364/479.1 |
| 6,198,986 B1 | * | 3/2001 | McQuinn | 700/242 |
| 6,230,091 B1 | * | 5/2001 | McQuinn | 701/50 |
| 6,253,691 B1 | * | 7/2001 | McQuinn | 111/118 |

FOREIGN PATENT DOCUMENTS

| | | |
|---|---|---|
| CA | 2174154 | 10/1997 |
| EP | 0 370 593 A2 | 5/1990 |
| EP | 0 726 024 A1 | 8/1996 |

* cited by examiner

*Primary Examiner*—Khoi H. Tran
(74) *Attorney, Agent, or Firm*—Troutman Sanders LLP; Gerald R. Ross; Ryan A. Schneider

(57) ABSTRACT

An improved mobile agricultural products crop input application control system is associated with a plurality of operably coupled application machines including a delay coordinating system particularly adaptable for use in site-specific (precision) farming, wherein selected discrete delay information unique to each on-board crop input storage release point, crop input transport system, and/or crop input dispensing point is combined with anticipated field reference point data obtained with a machine positioning system, e.g. "Dead Reckoning", GPS, and/or radar, and a computer, to direct independent functioning of selected on-board storage devices, material transport systems, crop input release point mechanisms and/or dispensing point mechanisms to ensure stored products are released for a timely combination to achieve a predetermined quantity and prescription of products delivered to the anticipated field reference points as the plurality of operatively coupled crop input applicator machines travel over a predetermined geographic land area. The delay coordinating system provides environmental advantages to all through enhanced resource management by more accurately and precisely placing agricultural products resulting in a significant improvement in the use of crop input/planting resources.

30 Claims, 16 Drawing Sheets

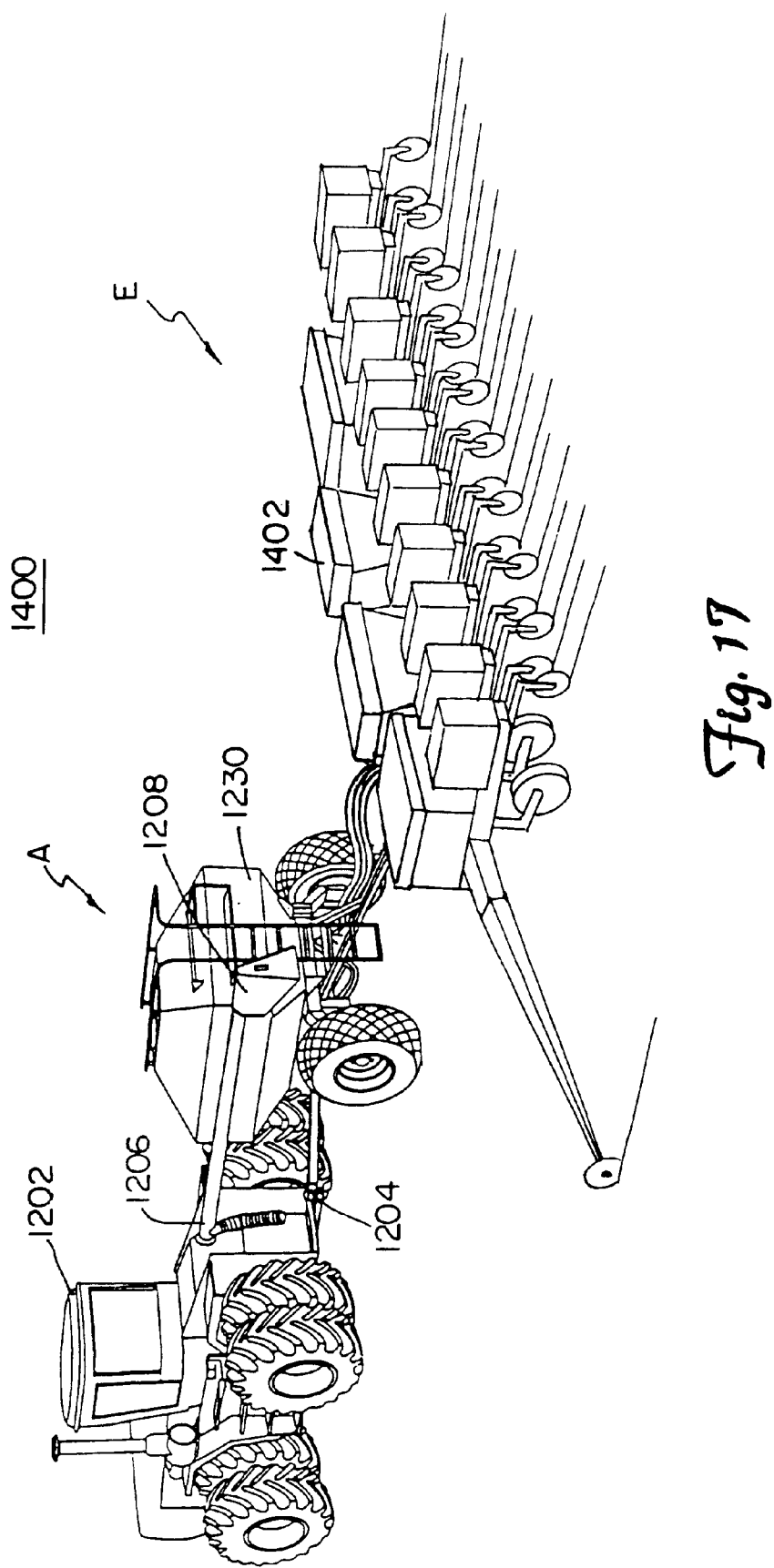

DELAY COORDINATING SYSTEM FOR A SYSTEM OF OPERATIVELY COUPLED AGRICULTURAL MACHINES

CROSS-REFERENCE TO RELATED APPLICATIONS

This patent application is a continuation-in-part of U.S. patent application Ser. No. 08/766,420, entitled Delay Coordinating System For Agricultural Machines, filed by Alvin E. McQuinn on Dec. 12, 1996 now U.S. Pat. No. 6,089,743.

BACKGROUND OF THE INVENTION

This present invention relates generally to control systems, and more particularly to a delay coordinating system for controlling a plurality of agricultural product (crop input) release points on one or more operatively coupled agricultural machines in response to various inherent delay times between predetermined vehicular mounted control points and the ultimate machine crop input application dispensing points. The time variance of each different dispensing point and release point must be measured and all the varying times coordinated by a computer program to bring them all together at the precise moment in time for the desired dispensing moment. The computer program is responsive to one or more stored digitized soil maps of the location of various soil types, topographical features, and/or qualifying characteristics such as nutrient levels, soil compaction, drainage or any other qualifying crop production characteristic.

Various agricultural product applicator systems and associated methods of control have been suggested at one time or another, but in each instance, these systems leave something to be desired. For example, there is a need for an applicator system that ensures agricultural products dispensed from a plurality of moving operatively coupled applicator machines are accurately and precisely combined prior to being dispensed. Agricultural product applicator systems which estimate an average composite dispensing delay time experienced when dispensing crop inputs from a moving product applicator machine have been developed. Generally, these systems are limited to use of a cursor on a display device to locate a field reference point in front of a moving machine and then apply an estimated or average product dispensing delay time such that conveyance or flow of any/all product(s) to be dispensed at the field reference point will be initiated at a single common predetermined moment before the machine reaches the target point. The point at which product flow is initiated is determined from factors including ground speed of the applicator machine and the total amount of time it takes from the moment when crop input flow is initiated from onboard the machine and the moment a crop input is dispensed from a wet boom, dry boom, and/or injector tube, for example. However, the variable nature of flows and random locations of various crop input or planting product release points associated with multiple storage devices create unaccounted for delays and result in misapplications and inaccurate combinations of multiple crop inputs.

One system known to those skilled in the art of agricultural products (crop input) application includes an agricultural machine having a single bin containing planting products such as seeds or crop input application products such as herbicides, insecticides, fertilizer, anhydrous ammonia, various chemicals, or other crop input products. Generally, such systems are ground-speed coordinated to start metering crop inputs from the product bin when the applicator machine reaches the target point, generally ignoring the lag or delay time between the start of product release from the product bin and the time a desired product reaches the ground.

Still needed, but not available with product applicator machines and associated control systems presently known in the art is an agricultural products crop input applicator system which allows one or more operatively coupled product applicator machines to commence and terminate metering a plurality of planting or crop input products at different moments in time for a common reference point in a field, for example. Such a need exists for product applicator machines having multi-product storage devices such as bins mounted upon one or more of the machines or having multi-conveyor and/or product flow devices or having multi-point product dispensing devices, for example. It can readily be appreciated that use of a single estimated or average composite system delay will be inadequate to provide for accurate and precise application of multiple agricultural products when variable rate applications are being made, i.e. where more than a single product, storage device, e.g. bin, or material transport system, i.e. conveyor is used with the machine(s).

A solution is to provide a system of variable rate, operably coupled agricultural product applicator machines with a time delay coordinating system which is capable of taking into consideration the nature of the individual products to be dispensed, the location of the individual product storage devices, i.e. bins, boxes, tanks, etc., and the type and nature of each dispensing device employed, wet booms, dry booms, nozzles, conveyors, spinners, planters, drop tubes, air tubes, injectors, etc., as well as the ground speed when variable rate applications are made across a field. Such a coordinating system must be capable of evaluating each system feature such as stated above and coordinating a unique delay time for each agricultural product (crop input) dispensed from the applicator machine(s). Using such a system will then prevent premature or latent application of the agricultural products (crop inputs) to a desired target area traversed by the operably coupled applicator machine(s). Unless the timing delay differences associated with the various machine release points are considered and coordinated, accurate and precise applications are impossible. The present invention provides a solution for the management and control of the aforesaid differences.

Modem applicator machine control systems typically have a host controller located within the operator cab of the machine, including a processor with associated input and output devices. The host is generally directly linked to at least one other controller which may also be located within the cab, and which is responsible for all communication to devices on the machine, such as shown in U.S. Pat. No. 4,630,773, issued Dec. 23, 1986, to Ortlip, entitled Method and Apparatusfor Spreading Fertilizer, and U.S. Pat. No. Re 35,100, issued Nov. 28, 1995, to Monson et al., entitled Variable Rate Application System, both assigned to Ag-Chem Equipment Company, Inc. of Minnetonka, Minn., the Assignee of the present invention. The system disclosed in the '100 reissue patent comprises a controller accessing a soil map indicating a soil characteristic for each portion of the field. Field locations and status maps indicating current crop input level at various locations in a field to be treated are monitored by a control system. A crop input map is updated after a dispensing pass to provide a real-time record. Position locators for the machine in the field may include "Dead Reckoning", GPS, or LORAN systems, for example.

Similarly, U.S. Pat. No. 5,355,815 discloses a closed-loop variable rate applicator. The system operates by determining a soil prescription in near real-time and dispenses crop inputs to the soil scene as a fraction of the soil prescription. The '815 patent is also assigned to Ag-Chem Equipment Company, Inc. and is incorporated herein by reference in its entirety.

Another system is disclosed in U.S. Pat. No. 5,453,924, issued Sep. 26, 1995, to Monson et al., entitled Mobile Control System Responsive To Land Area Maps. This system expands on earlier known applicator machine controls systems including those assigned to Ag-Chem Equipment Company, Inc., by incorporating a distributed network scheme which links a host controller positioned within the operator cab to multiple intelligent controllers located at various points on the machine external to the operator cab. All of the above patents are assigned to the Assignee of the present invention and are incorporated by reference in their entirety herein. The control systems discussed herein above describe systems which, when properly adapted with the inventive algorithmic software and associated control devices, may be used to practice the present invention.

SUMMARY OF THE INVENTION

The limitations of the background art discussed herein above are overcome by the present invention which includes a delay coordination control system adapted for use on variable rate, multiple crop input applicator machines, and particularly operably coupled agricultural products applicator machines. As used herein, the term crop input applicator machine includes, but is not limited to any self-propelled or towed fertilizer spreaders, chemical applicators, planter devices, e.g. corn planter, seed drill devices, air seeders, air spreaders, air tubes and any dispensing devices that spread, apply and/or inject crop inputs, e.g. lime, inserve, crop protection agents, granular and liquid herbicides, insecticides, fertilizers, chemicals, anhydrous ammonia, nitrogen inhibitor, micronutrients, seeds, and any combinations thereof, for example. The present inventive operably coupled product applicator system addresses the problems associated with the effects of uncoordinated and undesirable individual system delays in agricultural products (crop input) delivery rates and quantities which result from use of multiple agricultural products, multiple product storage devices, multiple material transport systems, multiple metering release points, and/or multiple product dispensing devices attached to a plurality of operably coupled product applicator machines.

The present inventive variable rate, multiple product applicator system also provides solutions for the problems associated with the interactive effects of the aforesaid machine features where a single product is combined with a plurality of product storage devices, one or more material transport systems, and a plurality of dispensing devices. The delay coordination system is a ground-speed coordinated system which is customized to ensure accurate and precise application of agricultural products, e.g. crop inputs to a desired target area being traversed by the application machine(s), regardless of inherent delay differences in individual storage devices such as bins, boxes, tanks, etc., as well as inherent delay differences in individual conveyor mechanisms, flow devices, etc., and inherent delay differences between multiple crop input metered release points and dispensing points located on the machine(s). The increased precision and accuracy provided by the present invention also results in significant environmental advantages and gains by all as a consequence of reduced waste related to resource usage due to improved placement of crop inputs. As used herein, ground speed or machine speed means machine velocity. Crop input release point means the actual point where a stored product is discharged from a product storage device via a product metering device. Crop input product dispensing point means the actual point where a crop input product is discharged from the application machine. The delay coordination system can also be adapted to consider delay time differences due to distinctions in the viscosity and frictional flow characteristics for the different agricultural products (crop inputs) being dispensed from the applicator machine.

Use of the present delay coordination system allows each variable rate applicator machine to be customized to provide the optimum results for the end users. For example, any specific machine can be customized by altering the number and particular location of product storage bins and/or tanks mounted to the applicator machine. Delay times for a particular storage bin/tank may differ by as much as six to seven seconds, for example. Therefore, for accuracy, it may be necessary to instruct the product metering device to initiate the product stored in one bin/tank to start flowing six to seven seconds before the product stored in a different bin/tank. Controlling these time flow differences is necessary when products from different bins/tanks must reach the ground at the same point and/or time. Similar differences exist with various types and locations of flow mechanisms, conveyor mechanism, etc. The time variance of each different dispensing point and release point must be measured and all the varying times coordinated by algorithmic software to bring them all together at the precise moment in time for the desired dispensing moment.

While today, grid samples and other agronomic information are most commonly taken in two acre and above land increments, it is anticipated by the present inventor that conducting of a much more intense level of soil testing, e.g. tissue sampling, as well as implementation and use of other systems to determine crop input requirements at a given site will become desirable, viable and economically feasible. Even now, yield monitor data is collected in real time and can be used to help establish site-specific crop input/planting requirements. Significant changes in soil/field conditions have been found by the present inventor, to occur even within a distance of a few feet, for example. Therefore, the importance of tighter control of crop input application has and will continue to become more relevant and necessary.

The present inventive delay coordination system therefore provides a vast improvement over product application systems known in the art which use cursor anticipation devices and methods to estimate a single fixed universal estimated composite delay time for a moving applicator machine to provide some increase in accuracy and precision when dispensing products. The aforesaid improvement is the result of providing a system, as stated herein before, in which each specific control point and its associated crop input metered release point on the applicator machine are customized with a precise delay time thereby ensuring that any product to be dispensed is accurately applied. In this way, each product is dispensed for a desired target area of known conditions, all based upon formerly measured conditions and values for that desired target area.

In one aspect of the present invention, the construction and arrangement is employed wherein a variable rate, multiple crop input applicator delay coordination system is programmed relative to individual idiosyncrasies of one or more individual but operably coupled together agricultural product (crop input) applicator machines, i.e. location, length and type of individual and distinct conveyors and spreading devices such as a spreading wheel or tool bar, specific bin/tank delay differences between multiple bins/tanks, etc.

In yet another aspect of the present invention, the construction and arrangement is employed wherein a product applicator delay coordination system is employed to consider individual idiosyncrasies of one or more attached applicator machines such as a towed machine or multiple units, side by side or towed in tandem.

A feature afforded by the present invention is improved precision and accuracy of product dispensation including the desired mix and prescriptive quantity of product delivered at an anticipated location of known conditions based upon formerly measured conditions and values at the anticipated location when one or more operably coupled product applicator machines arrive at the desired target location in a field.

Another feature afforded by the present invention is the provision of a delay coordination system which is adaptable for use with any type and combination of one or more applicator machines.

Yet another feature afforded by the present invention is the provision of a delay coordination system which allows any desired product applicator machine or combination of operably coupled applicator machines to be adapted for precision applications of crop inputs. Such modifications will maintain the integrity of the product application process in any manner.

Still another feature afforded by the present invention is the provision of a delay coordination system which is adaptable via algorithmic software for use with various variable rate, multiple product applicator machines, such as between a powered applicator machine and any combination of one or more towed machines, or between different and distinct applicator machines, all while preserving the integrity of the product application process associated with each individual machine.

Still another feature afforded by the present invention is the provision of a system resulting in environmental gains for all due to reduced wasting of resources as a consequence of greater accuracy and placement, i.e. place the crop input where it is needed and will be used, of those resources, e.g. seed, fertilizer, and farm chemicals.

BRIEF DESCRIPTION OF THE DRAWINGS

FIG. 17 is a perspective view illustrating an additional "mule-train" arrangement product application system capable of carrying out site-specific application of multiple selected products when used in combination with the present delay coordinating system.

DETAILED DESCRIPTION OF THE PREFERRED EMBODIMENTS

The preferred embodiments described as follows, address the long felt need by those in the agricultural industry to provide a crop input product application system capable of accurately and precisely dispensing a plurality of agricultural products (crop inputs/seeds) simultaneously in a desired mix and/or prescriptive quantity at an anticipated location when the crop input product application system arrives at the anticipated location in a field. In accordance with the preferred embodiment of the present invention, and with particular attention being directed to FIG. 1, a simplified block diagram illustrating one embodiment of a delay coordinating control system 50 suitable for implementing multiple crop input release points and/or dispensing points delay coordination for a system of variable rate operably coupled product application machines is shown to include a host computer 14, a GPS (Global Positioning System)

receiver 52, and a radar device 54. The GPS is an accurate three-dimensional global positioning satellite system which provides radar positioning and navigation needs for the product application machine. GPS systems are known to those skilled in the art of satellite positioning systems and will therefore not be discussed in great detail except as made reference to herein after. The present invention is compatible for use with "Dead Reckoning" systems and satellite positioning systems such as AgNav™, Navstar Global Positioning System, Differential GPS Systems and other GPS based or equivalent systems to cooperatively update a resident positioning and navigation data base on a real-time basis. The present invention is also compatible for use with non-GPS based navigation systems that operate independently of satellite communications. Generally, when the present invention is used in conjunction with a GPS based navigation system, the GPS is initiated when the receiver 52 starts to track pseudorandom noise from multiple satellites and generates GPS data which is subsequently used by the machine control system, e.g. FALCON® to estimate time of arrival values for the machine to arrive at an anticipated location in a field, for example. A more detailed description of a GPS system can be found in U.S. patent application Ser. No. 08/766,420 to Robert J. Monson, filed Jan. 22, 1996, entitled AUTOMATIC TOPOGRAPHICAL MODEL GENERATION METHOD AND APPARATUS, which is incorporated by reference in its entirety herein. Working in combination with one another, the GPS receiver 52, radar device 54, and host computer 14, then track and anticipate a product application machine reference point in a field, including machine location, speed, and direction.

Figure 1:
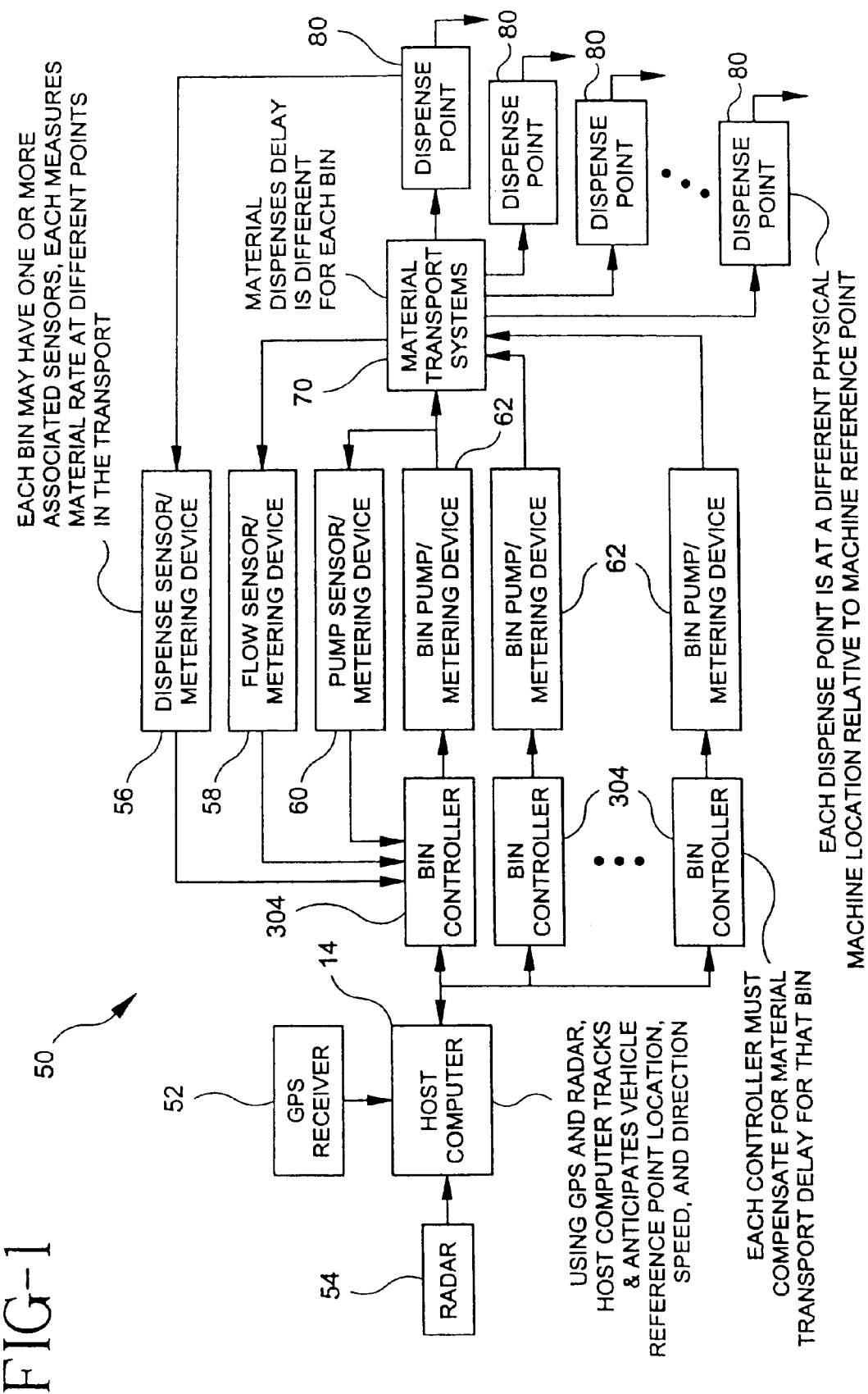
FIG. 1 is a simplified block diagram illustrating one embodiment of a delay coordinating system suitable for implementing metering point delay coordination for a variable rate, multiple agricultural products (crop input) application machine in accordance with the present invention.

Looking again at FIG. 1, the delay coordinating system 50 may have multiple control modules or devices (such as bin controllers) 304. Heretofore, delay coordination has been accomplished by provision of a single average composite application machine delay incorporated into the application machine control system. It is recognized by few skilled in the art, that a certain delay or lag time exists between the moment when a controller instructs or initiates a product flow process onboard the machine and the moment the product is actually dispensed from the machine onto the ground. One attempt to solve this problem in the application equipment industry has been to use a single fixed estimated or average composite delay coordination process to eliminate product spreading inaccuracies. However, unless the timing attributes from the various machine release points are considered and coordinated, accurate and precise applications are impossible. This invention provides a system to manage and control these differences.

The present inventor has found that product spreading inaccuracies are often unacceptable, especially when spreading or dispensing multiple products, or products stored in multiple storage devices attached to a variable rate product application machine or any multiple combination of operatively coupled variable rate applicator machines thereof. For example, it is not unusual for product being dispensed from one bin/tank to actually strike the ground six to seven seconds before or after a product dispensed from a second different bin/tank strikes the ground, when product flow from both bins/tanks is simultaneously initiated. A machine that is moving at twenty mile per hour may therefore inaccurately apply one or more of the products to the ground more than two-hundred feet away from the anticipated reference point. Such inaccuracies have been found by the present inventor to be unacceptable because significant differences in site-specific conditions can easily occur within a distance of only a few feet. Taking into consideration the cost of seed, fertilizer, chemicals, and other crop inputs, environmental concerns, and the depressed product yields possible from improper application of crop input mixes and incorrect prescriptive quantities, a need presently exists for an improved delay coordination system. Such a system must take into consideration, the individual metering point timing delays inherent on a variable rate multi-product application machine or a plurality of such machines that are operatively coupled together to form an application system. Such a system will ensure that the product flow process associated with each product (crop input) release point and/or dispensing point attached to the variable rate application machine(s) is initiated at a unique and distinct moment in time as the machine(s) traverses a field to ensure a desired prescription and quantity of crop inputs is delivered to each field point for which they were intended. This process then contrasts with earlier known application systems where the product flow processes for all product release points and dispensing points attached to the application machine are at best simultaneously initiated at a common moment in time, but most often completely ignored.

With continued reference to FIG. 1, the present delay coordination system 50 also will have incorporated multipe metering points including, but not necessarily limited to storage bin/tank release point pumps, meters and sensors 60, and/or flow meters and sensors 58, and/or dispensing point meters and sensors 56. These devices 56, 58, 60 are used to control and measure the product flow rates at different locations within the delay coordination system 50. For example, product flow from a storage bin/tank is initiated when a bin/tank controller 304 is instructed via host computer 14 to actuate an associated control device 62. It will be appreciated that any control device 62 may have metering characteristics different from other control devices 62 within the delay coordination system 50. Therefore, each may have distinct and characteristically different metering rates than other control devices 62 within the delay coordination system 50. Likewise, the delay coordination system 50 may have incorporated multiple material transport systems 70, or may have a common material transport system 70 interconnected to product storage devices located at different points on the application machine or multiple hi combinations of operably coupled machines thereof. Such material transport systems 70 and/or structures also create different product flow rates throughout the system 50. Similarly, multiple dispensing points 80 or product release points (enumerated as 306 in FIG. 4) may also be incorporated at different physical machine locations. Such different physical locations will add to differences in individual product flow times between system release points 306 and associated product dispensing points 80 within the delay coordination system 50. For example, it is known that wet booms and dry booms are commonly used to spread agricultural products (crop inputs) onto the ground as a spreading machine traverses a field. These booms have multiple product dispensing points 80 dispersed over the entire length of the booms. Thus, products to be spread onto a field through such booms will exit the product dispensing points 80 sequentially as the product reaches each product dispensing point 80. Each dispensing point 80 within the boom will then have a unique and distinct process delay dependent on the physical machine location of the dispensing point 80 relative to a machine reference point. The present delay coordination system can be adapted for use with appropriate spray nozzle controls to control actuation of individual dispensing point spray nozzles, thereby controlling the delay times associated with each respective dispensing point 80.

The present invention is not so limited however, and it will readily be appreciated that any variable rate multiple product application machine or plurality of such machines operatively coupled together having an on-board computer 14 and a machine tracking system such as a GPS receiver 52 in combination with a radar device 54 can be adapted to operate in conjunction with the delay coordinating control system 50, regardless of the location, nature and type of product storage devices, controller devices, metering devices, sensor devices, material transport mechanisms and devices, and crop input release points and dispensing point locations and mechanisms. The present delay coordinating system 50 can easily be customized to work with any one or more variable rate multiple product application machines, powered or towed, including operably coupled combinations thereof, using either manual or automatic data entry. For example, the application machine can be customized by operating the machine and taking manual measurements of the delay times between activation of selected metered release points and the ultimate dispensing of crop inputs. The delay time for each distinct path can then be entered into the host computer 14 via a keyboard, for example. The time difference between each metering point will most preferably be entered into an algorithmic software data base for each variable rate machine.

Every variable rate crop input application machine has its own system of electronics, hydraulics and control mechanisms which may be unique unto itself or common to a family of variable rate application machines. The present inventive system and method takes these machine characteristics into consideration to coordinate the necessary electronics, hydraulics and control mechanisms in order to achieve accurate combinations and precise placement of crop inputs thereby elevating state of the art variable rate application technology to a higher level.

Figure 2:
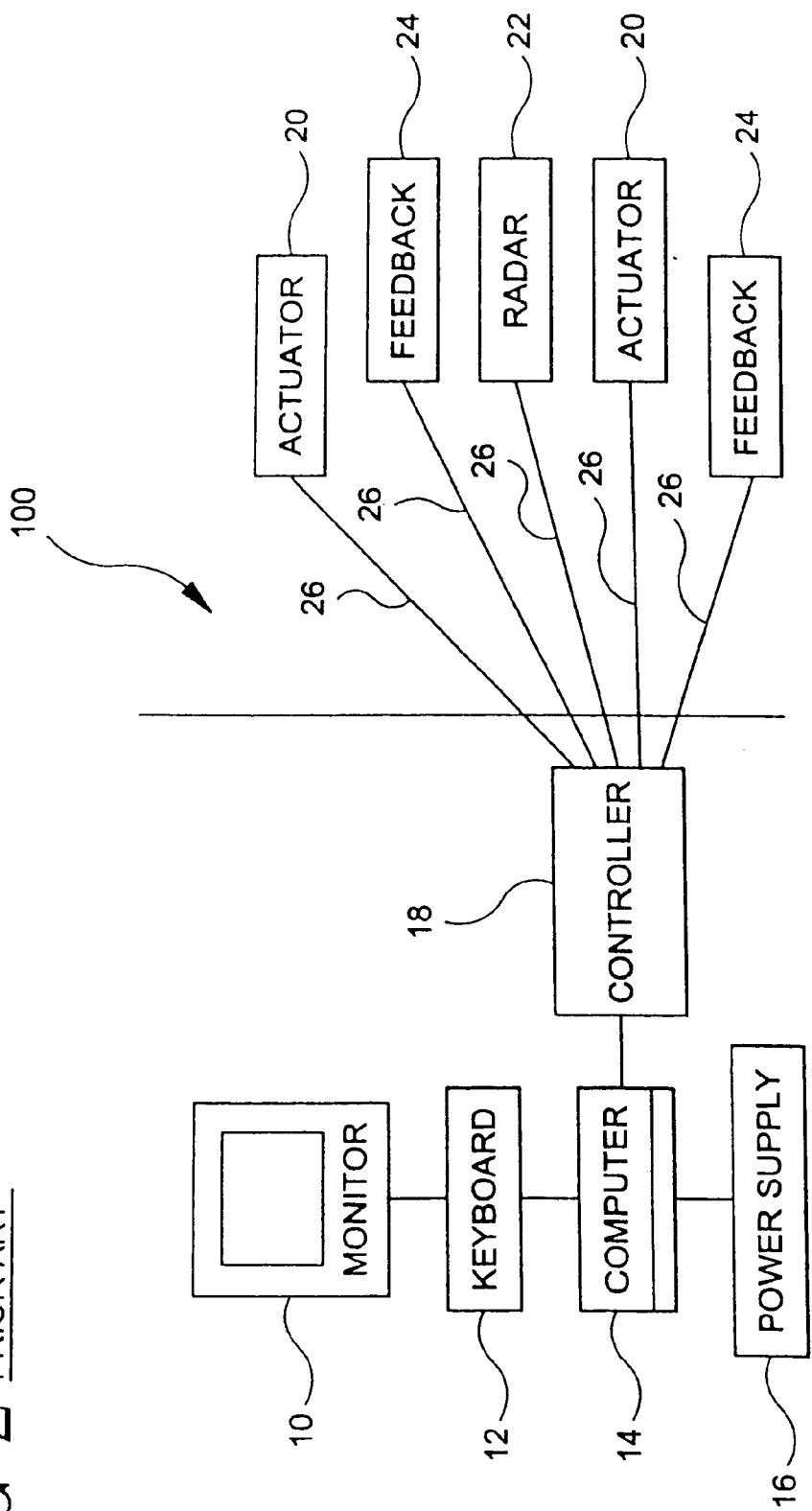
FIG. 2 is a simplified block diagram illustrating a variable rate product application machine control system disclosed in the prior art which may be adapted for use with the delay coordination system depicted in FIG. 1.

Making reference now to FIG. 2, one control system 100 is illustrated having a cab mounted host computer 14, keyboard 12, monitor 10, and a single controller module 18. The controller module 18 is coupled via communication cables 26 to distinct actuator devices 20 and feedback devices 24. As stated herein above, the delay time associated with each metering point is preprogrammed into algorithmic software or can be entered into the host computer 14 via keyboard 12. When used in conjunction with a GPS receiver 52 and/or a radar device 54, the computer 14 can be programmed in accordance with the present invention such that as the variable rate machine/system of operatively coupled machines traverses the field to be planted or apply crop inputs, each actuator 20, i.e. release point actuator, will be individually and distinctly activated automatically to compensate for delays in the flow of product seen between product(s) emerging from its respective storage device release point and subsequently emerging from its associated product dispensing point 80 attached to the variable rate machine(s).

Figure 3:
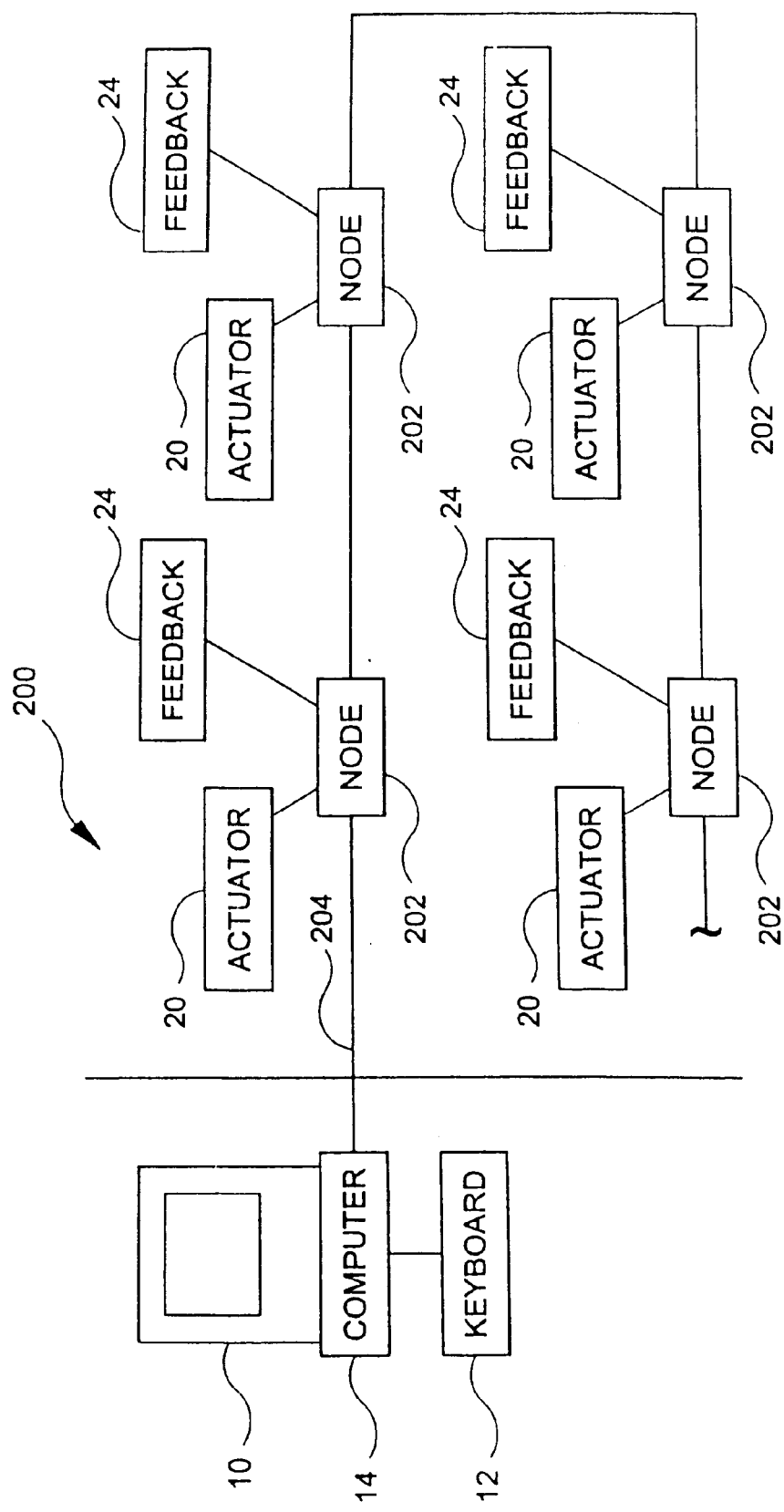
FIG. 3 is a simplified block diagram illustrating a FALCON® variable rate product application machine control system which may be adapted for use with the delay coordination system depicted in FIG. 1.
Figure 4:
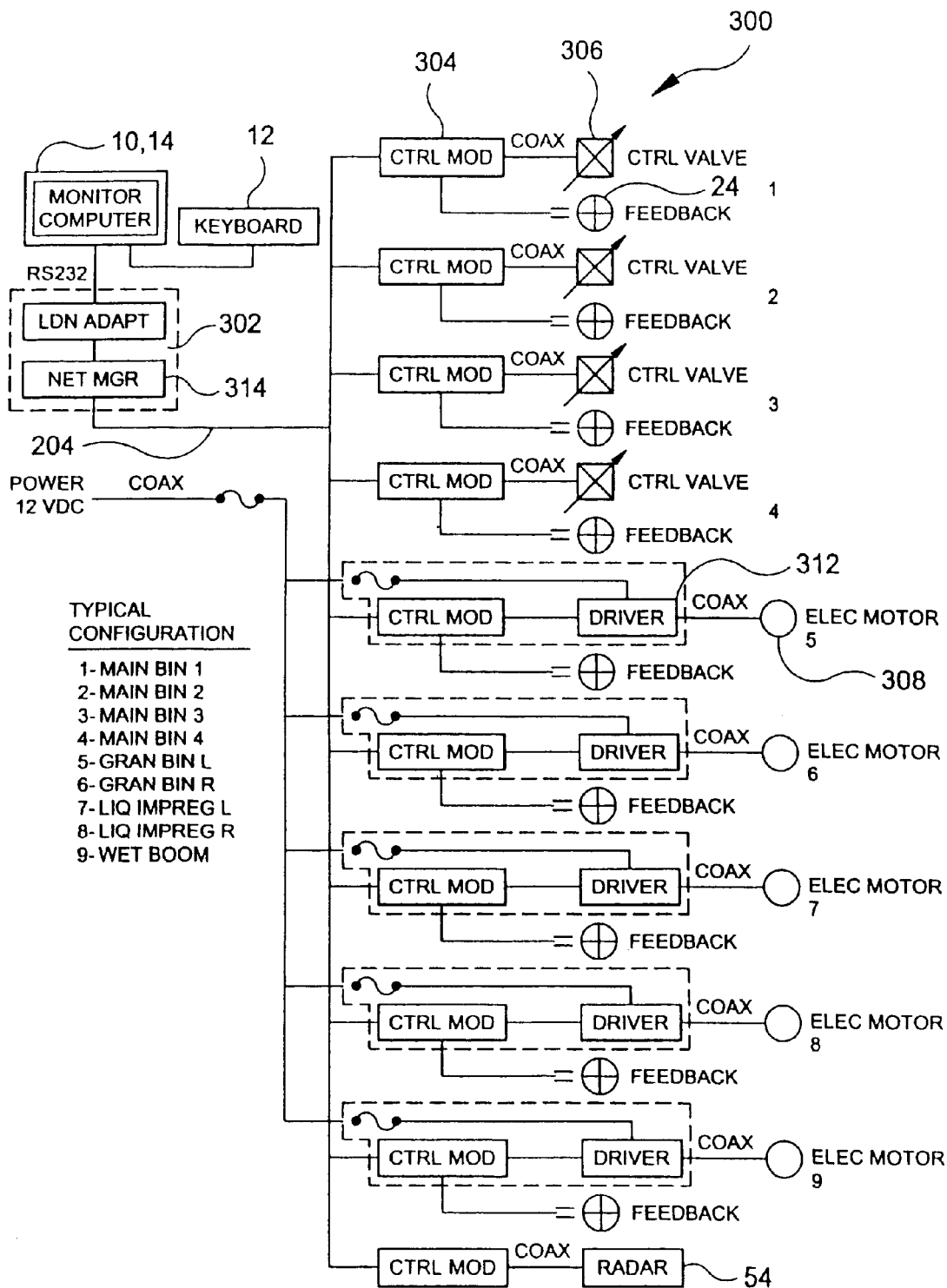
FIG. 4 is a more detailed block diagram of the FALCON® variable rate product application machine control system illustrated in FIG. 3.

Looking now at FIG. 3, another control system 200 known as FALCON® is illustrated having a cab mounted host computer 14, keyboard 12, monitor 10, and further having multiple independent nodes 202. Each node 202 can include a unique and distinct control module 304 capable of two-way communication between the host computer 14 and the respective node 202 and also between an actuator 20 such as a bin pump (metering device) 62, or between a particular flow sensor 56, 58, 60 or set of sensors 56, 58, 60 and a respective node 202. Upon machine startup, the host computer 14 can prompt individual control modules 304 to interrogate each sensor 56, 58, 60, each product storage device, each transport system device, each product release device, e.g. bin pump 62, and/or dispensing device associated with that particular control module 304 via a feedback network 24 such as illustrated in FIG. 4. Before the machine is put into operation, the machine can be operated in a fully functional mode at a designated site such as the manufacturing plant to determine appropriate timing delays necessary to customize the machine according to the present invention. During the customization process, each control module 304 can interrogate each sensor 56, 58, 60 or device stated herein above necessary to properly customize the application machine. Presently, the best mode for implementing the present invention makes use of pre-measured timing delay data which is entered into the algorithmic software data base. However, it is anticipated by the present inventor that the timing delay data may also be automatically entered into the data base via incorporation of appropriate release point sensors and/or dispensing point sensors as well as algorithmic software within the control modules 304 and/or the host computer 14. The control modules 304 then communicate the necessary timing delay data to the host computer 14 where the timing delay data is stored in a data base for use by the present inventive delay coordinating system 50. As stated herein before, the control system 300 can be adapted to include a GPS receiver 52 such that the host computer 14, GPS receiver 52, and/or radar device 54 function to track and anticipate a field reference point utilizing machine location, speed, and direction in a manner that allows the host computer 14 and control modules 304 to compensate for each timing delay identified on the variable rate application machine(s) in accordance with the present invention. Control system 300 can also be adapted to operate in accordance with the present invention using a "Dead Reckoning" system, as stated herein above. The control systems 100, 200, 300 described herein are disclosed in more detail in the '924 patent referenced herein before and incorporated in its entirety by reference herein, and so further details will not be discussed to preserve clarity and brevity.

Figure 5:
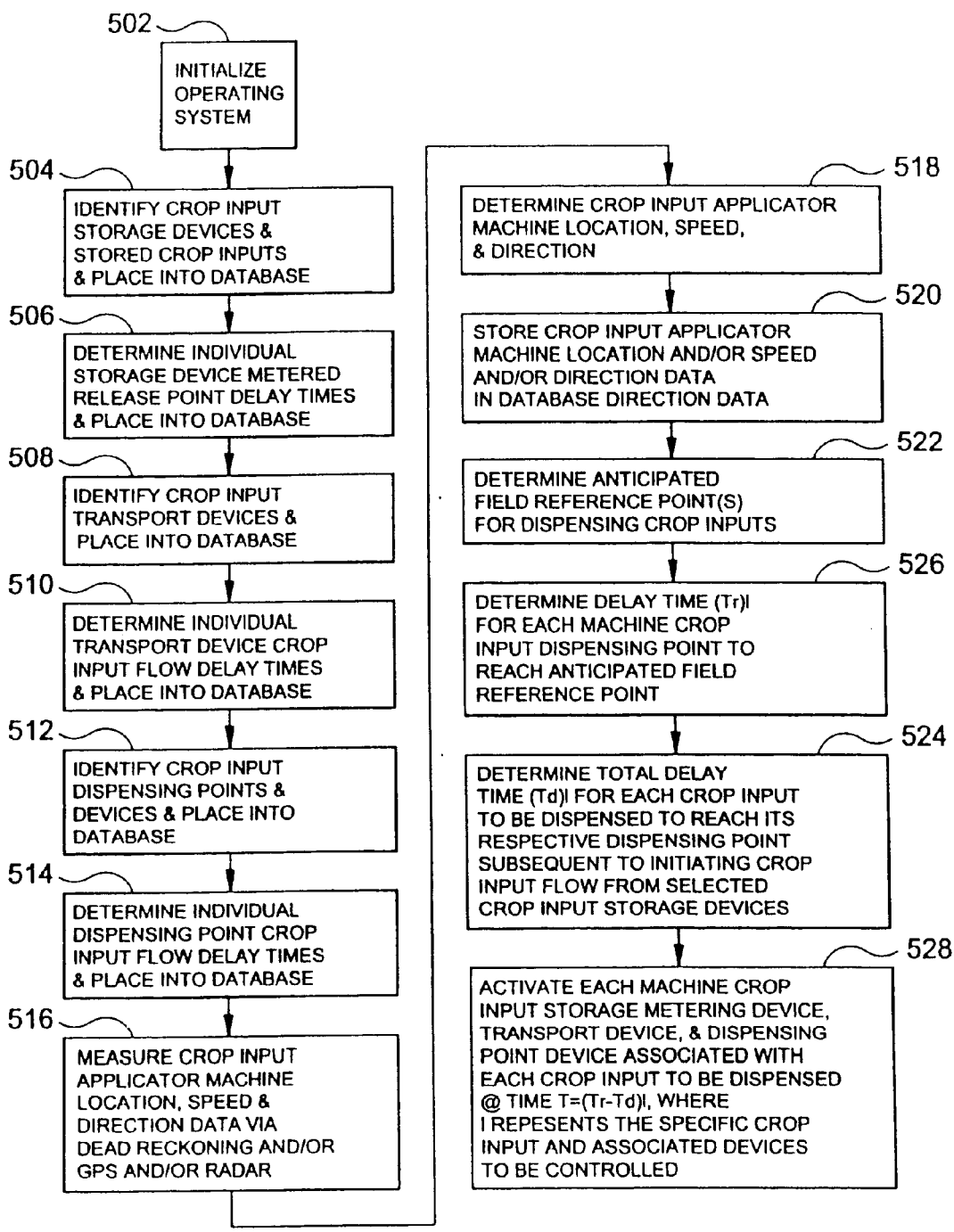
FIG. 5 is a simplified flow diagram illustrating operation of the present inventive delay coordinating system to simultaneously control a plurality of agricultural products (crop input) application distribution attributes associated with a variable rate, multiple product application machine.

FIG. 5 is a simplified flow diagram illustrating operation of the present inventive delay coordinating control system 50 to simultaneously control a plurality of product release points 306 attached to a variable rate multiple product application machine or combination of such application machines that are operatively coupled together to form a more complex application system. Starting with block 502, the host computer 14 and/or the control modules 304 attached to the application machine/system are initialized by booting the system 50, thereby activating the operating system containing the software algorithms discussed hereinafter. As used herein, the words "software algorithms" mean algorithmic programs used to direct the processing of data by a computer or data processing device. Following the boot-up or initialization procedure 502, each specific product storage device, i.e. bin (single and/or multi-compartment), tank, hopper, etc., is identified as shown in block 504 and assigned crop input release point delay data which is unique for each type of product storage device. The delay data for each storage device attached to the machine(s) is then placed into a data base as shown in block 506. Presently, the aforesaid timing delay data is preprogrammed into the data base along with any other timing delay data described herein below. Following entry of the aforesaid crop input release point delay data into the database, each product transport device, i.e. conveyor, spray boom (dry and/or wet), etc., is identified as shown in block 508 is also assigned crop input flow time delay data which is unique for each type of transport device. Similarly, the time delay data for each transport device attached to the machine is then placed into a data base as shown in block 510 and subsequently utilized to enable each product transport device to be ground-speed coordinated as described herein after. The identification and data assignment procedures discussed above are then repeated for each dispensing device, i.e. air tube, spray nozzle, spreading wheel, etc., as depicted in blocks 512 and 514. As stated herein before, the aforesaid identification of specific features of the machine(s) and accumulation of associated time delay data into a data base may be accomplished either manually or automatically using product application control system structures and procedures discussed herein above adapted with appropriate sensors and algorithmic software in accordance with the present invention. Presently, the aforesaid time delay data is pre-measured and preprogrammed into the data base. Once the machine signature process is complete, and each distinct feature and its associated time delay data have been accumulated in a data base, the variable rate application machine(s) can then be put into operation utilizing a "Dead Reckoning" system, an appropriate non-GPS based positioning system, or a GPS receiver 52 and/or a radar device 54 to track and anticipate particular field reference points, utilizing the machine location, speed, and direction data as shown in blocks 516 and 518. The machine location, speed, and direction data are then stored in a data base as shown in block 520. As stated herein above, any reference to speed means velocity, including speed and instantaneous machine direction. The aforesaid location, speed, and direction data is then extracted from the data base to determine ongoing anticipated reference points for dispensing the desired products (crop inputs) as shown in block 522. The foregoing process is utilized to construct a signature or machine data base for the variable rate, multiple crop input application machine or family of operatively coupled machines as such machine or family of machines traverse a field. Data sufficient to determine an appropriate delay time (Td) for each machine metered release point as well as the time it will take each dispensing point to reach a designated anticipated reference point (Tr) is then extracted from the data base for use by the host computer 14 in calculating a coordination factor (T=Tr−Td) shown in blocks 524, 526, and 528. Each product release point is then blue printed with its own unique coordination factor for use by an associated controller module as discussed herein before. As the application machine(s) traverses a field, each product storage metering release point device, metering transport device, and metering dispensing device can then be activated to ensure that the associated dispensing point begins to emit desired products at the proper time (Tr−Td), thereby assuring a desired product mix and/or prescriptive quantity of products (crop inputs) are dispersed at the anticipated location when the application machine(s) arrives at the anticipated location in the field. It will be appreciated that the foregoing process will apply equally to accomplish individual control of unique crop input metered release points and associated dispensing points distributed on the variable rate application machine(s).

Figure 6:
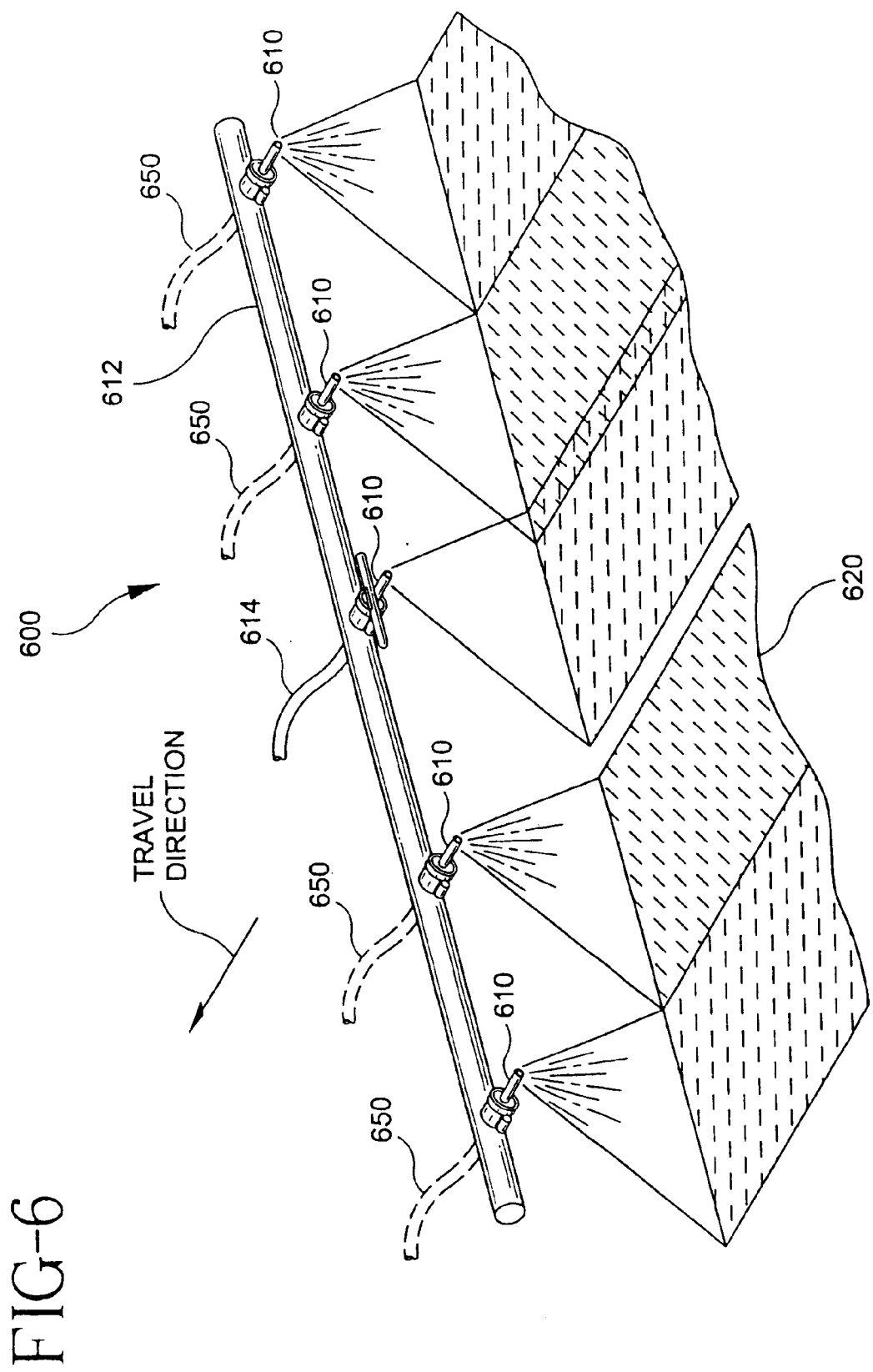
FIG. 6 is a perspective view of a wet boom for spreading a liquid product upon the ground, and which is suitable for use with the present inventive delay coordinating system.

FIG. 6 illustrates one embodiment for a wet boom assembly 600 having a plurality of spray nozzles 610 attached to a liquid or slurry product carrying manifold 612. The present invention is not limited to use with a wet boom however, and it will be appreciated that a wet boom has been exemplified for ease and clarification when describing a particular embodiment for the present invention. Wet boom assemblies having a single product supply conduit 614 are known to those familiar with the agronomic industry. The wet boom assembly 600 has a fluid transmitting conduit 614 which couples the product flow between the product storage device, i.e., tank to which it is attached, and the manifold 612. It will readily be appreciated that when using boom systems such as the boom assembly 600 depicted in FIG. 6, that any product entering the manifold 612 via conduit 614 will be first dispensed from those spray nozzles 610 located closest to the attached conduit 614 and will be dispensed last from those spray nozzles 610 located furthest from the attached conduit 614 when using a non-pre-loaded or non-pre-pressurized wet boom assembly having a single product supply conduit 614. Therefore, it can become undesirable to initiate product flow to the boom assembly 600 with a single fixed composite delay compensation scheme which affects each spray nozzle 610 equally. What is desirable and needed in the agronomic industry is a scheme whereby each spray nozzle 610 is attached to its own individually metered supply conduit as illustrated by combined reference numerals 614, 650. Such a modification of boom system 600 will allow the boom assembly 600 to be adapted for use with the present inventive delay coordination system 50. For example, when a variable rate, multiple product (crop input) application machine is traversing a field on its way to an anticipated location, each product flowing through each specific spray nozzle 610 can then be initiated utilizing its own unique delay coordination scheme to assure accurate and precise applications of crop inputs at the anticipated location when the machine arrives at the anticipated location in the field. As stated herein above, the present invention is not limited to use with a wet boom, however. The aforesaid delay coordination scheme is just as easily adaptable for use with dry boom systems or combinations of dry boom systems and wet boom systems, as well as planters, drills, spinners, air tubes, drop tubes, injectors, etc. as discussed herein before.

Figure 7:
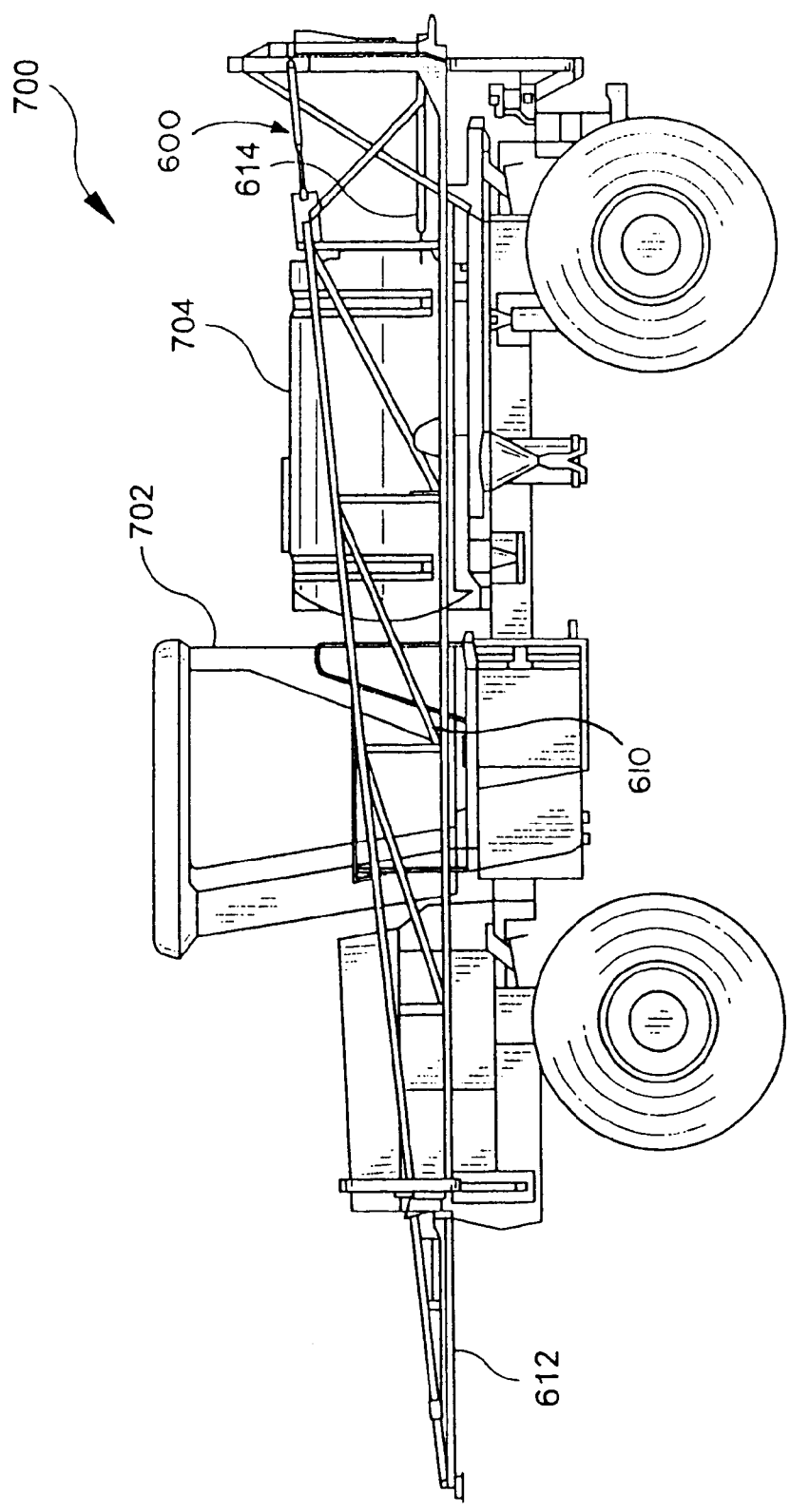
FIG. 7 is a perspective view illustrating one embodiment of a product application machine having a product storage tank and a wet boom such as that illustrated in FIG. 6, and which is adaptable for use with the present inventive delay coordinating system shown in FIG. 1.
Figure 8:
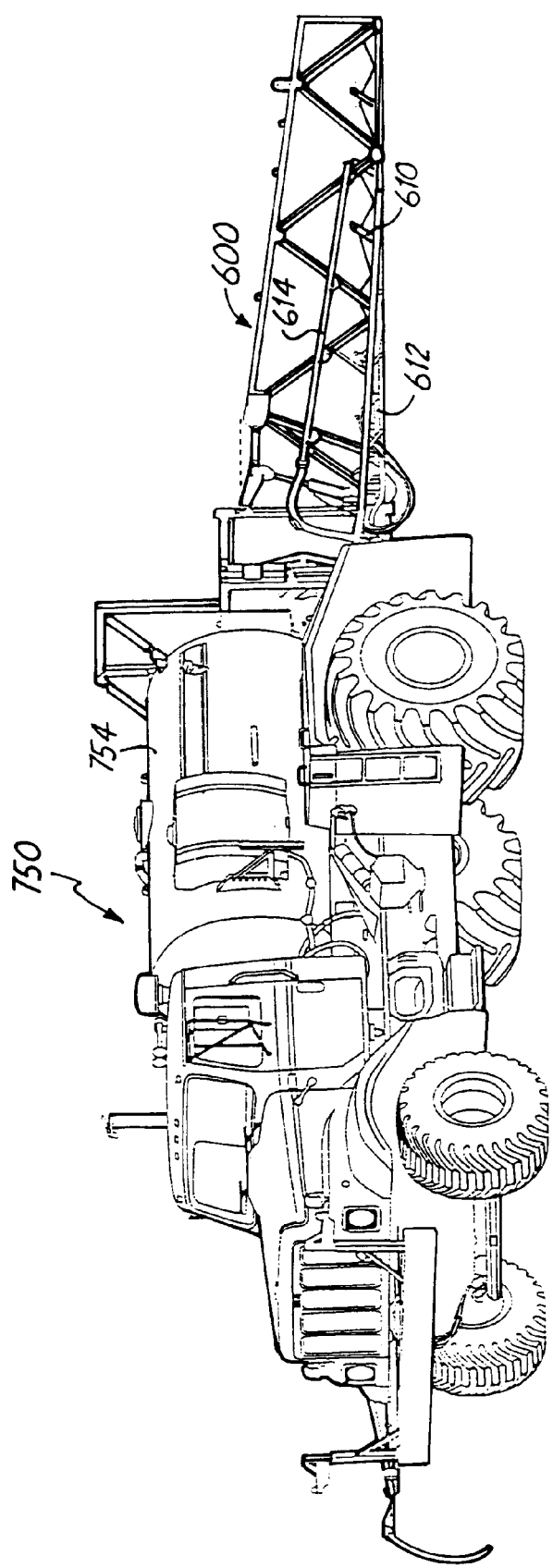
FIG. 8 is a perspective view illustrating another embodiment of a product application machine having a product storage tank and a wet boom such as that illustrated in FIG. 6, and which is adaptable for use with the present inventive delay coordinating system shown in FIG. 1.

Moving now to FIGS. 7 and 8, perspective views depicting product application machines 700, 750 familiar to persons skilled in the agricultural industry, and having a product storage tank 704, 754 and a wet boom assembly 600 such as that illustrated in FIG. 6, and which are adaptable for use with the present inventive delay coordination system 50 are illustrated. Product stored in the tanks 704, 754 is supplied to the boom manifold 612 via the supply conduit 614, as stated above. As stated herein before, the machines 700, 750 may be adapted for use with the present invention simply by providing the machines 700, 750 with a metered supply conduit 614 which is unique to each spray nozzle 610.

Figure 9:
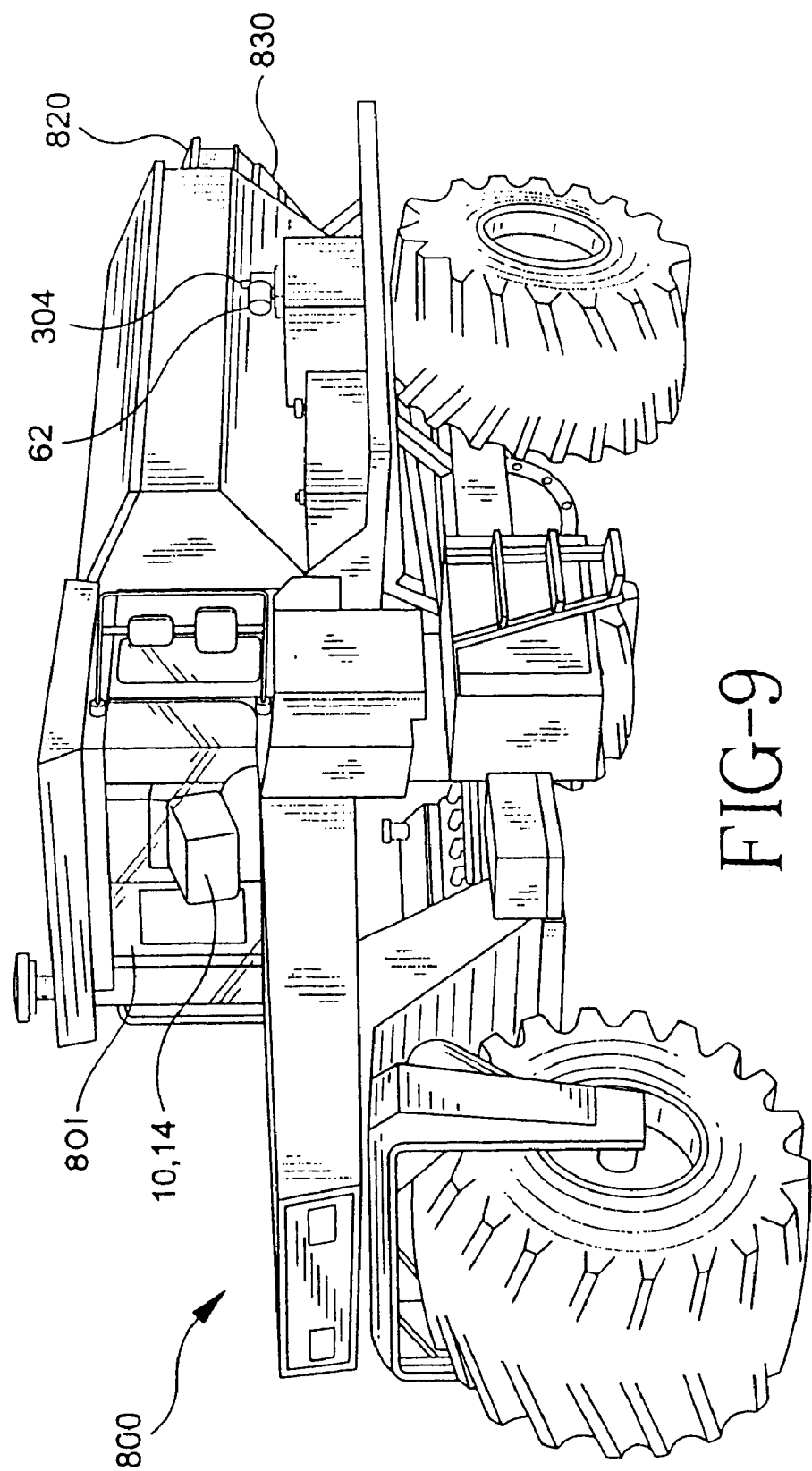
FIG. 9 is a perspective view of a multiple product application machine having a multi product box suitable for applying crop inputs/planting products at variable rates and which is adaptable for use with the present inventive delay coordinating system shown in FIG. 1.
Figure 10:
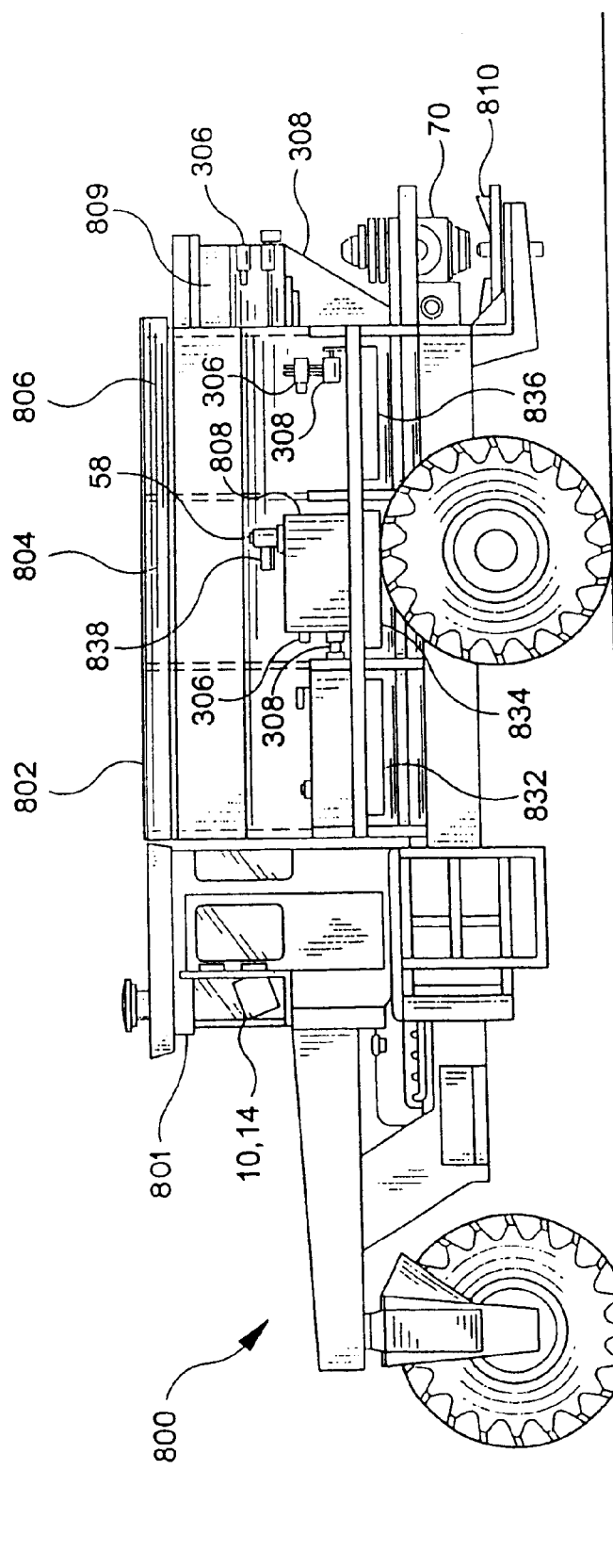
FIG. 10 is a detailed side view of the multiple crop input application machine having a multi product box illustrated in FIG. 8.

Another type of product application machine 800 known to those familiar with the agronomic industry, having multiple product storage bins 802, 804, 806, 808, 809 and a product spreader 810 is illustrated in FIGS. 9 and 10. Such machines are compatible for use with computerized control systems such as described in the '773 patent discussed herein above and incorporated by reference in its entirety herein. Generally, a host computer 14 is used in combination with a monitor 10 such as a CRT which is located within the operator cab 801 for use by a machine operator to move the machine 800 to an anticipated location in a field to dispense desired product mixes and/or prescriptive quantities of product (crop inputs) when the variable rate machine 800 reaches the anticipated location in the field. A detailed side view of the product application machine 800 is depicted in FIG. 10. The embodiment illustrated includes multiple storage bins 802, 804, 806, 808, 809 for storing a plurality of planting or crop input products, or alternatively for storing identical products chained together via storage bin 802, 804, 806, 808, 809 interconnecting devices which allow the application machine to switch back and forth between desired bins/tanks storing the same product during the spreading process. Prior use of systems such as the one described above for variable rate application of crop inputs have generally, but not optimally compensated for time delays between initiating the release of product(s) onto a material transport device 70 and the actual dispensing of the product (s) by using a single estimated or average composite delay time for the variable rate application machine viewed as a single giant dispensing point traversing a field. As stated herein before, such an approach is known by the present inventor to be significantly less than optimum since any variable rate multiple product (crop input) application or spreading machine 700, 750, 800 having multiple products, product storage devices, release points 830, 832, 834, 836, 838, dispensing points 80, and/or material transport devices 70 will not accurately, precisely and simultaneously apply all products to be dispensed to a plurality of anticipated reference points in a field as the machine(s) traverses the field, due to the interacting influence of multiple processing delays from a plurality of sources on-board the machine(s). Therefore, as stated and described herein above, the present invention provides a system and process for accurately and precisely delivering specific blends and/or prescriptive quantities of seeds or other agricultural products (crop inputs) to any anticipated reference site in a field as a function of a multi delay coordinating scheme which more accurately characterizes and compensates for the effects attributed to the spreading process by a plurality of system and processing delay variables associated with a particular machine or set of operably coupled machines. The present invention therefore, provides a structure and method of customizing any variable rate multiple product application or spreading machine, powered or towed, based on the particular machine signature or identity, rather than providing a standard, estimated, or average composite structure and method to be applied across the board to any application or spreading machine which has hereto before been generally known and accepted by some skilled in the agricultural product (crop input) application arts.

Figure 11:
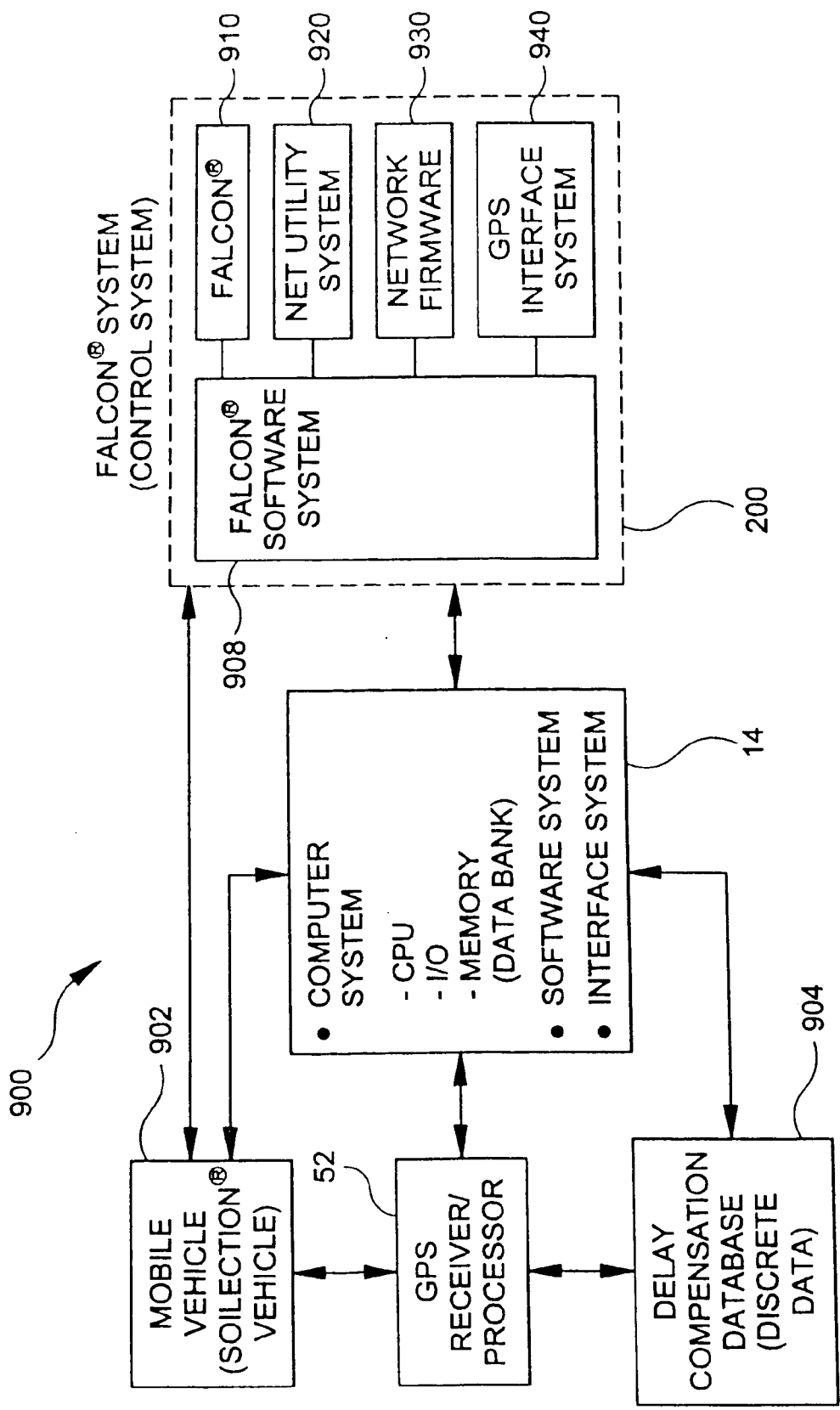
FIG. 11 is a simplified block diagram illustrating implementation of the present delay coordinating system onboard a SOILECTION® machine having a FALCON® variable rate control system.

FIG. 11 is a simplified block diagram illustrating implementation of the present delay coordinating system 50 on board a SOILECTION® machine 902 having a FALCON® control system 200 manufactured by Ag-Chem Equipment Company, Inc. of Minnetonka, Minn. A SOILECTION® machine 902 is described in detail in U.S. patent application Ser. No. 08/774,627 by Hauwiller et al., which is assigned to Ag-Chem Equipment Company, Inc. of Minnetonka, Minn., and incorporated by reference herein in its entirety. The present invention is implemented in part to further enhance a resident data base, such as for example, a geographical information system (GIS) like the SOILECTION® Geographical Information System (SGIS), also manufactured by Ag-Chem Equipment Company, Inc. of Minnetonka, Minn., and to provide accurate delay coordination data to application programs for use by the FALCON® (Fertilizer Applicator Local Control Operating Network) Control System 200. This implementation of the invention includes use of a Global Positioning System (GPS) 52 having a GPS receiver and an associated data processor, such as described herein above. The GPS receiver and data processor 52 is hosted by the SOILECTION® machine 902. Generally, the GPS system 52 is initiated when the receiver starts to track pseudorandom noise from a group of satellites and generates time of arrival times for an anticipated reference point by the product application machine. Thereafter, the GPS data processor takes over.

Accordingly, the SOILECTION® machine 902 receives GPS data which information is integrated with the delay coordination data determined and stored in a data base 904 as illustrated in FIG. 5 and discussed in detail herein before to establish the exact moments in time each machine release point metering device, e.g. actuator 20 must be actuated to accurately and precisely apply the desired crop input products as the SOILECTION® machine 902 traverses the field. The delay coordination data is integrated with the SOILECTION® machine 902 controls through the FALCON® system 200. The FALCON® system 200 includes the FALCON® software system 908. The subdirectories of the FALCON® software 908 include: FALCON® 910 which functions as host system and interface; net utility system 920 which functions as a network utilities and diagnostics software; network firmware 930 in which a downloadable code such as Neuron C® resides, and GPS interface system 940 which is a dedicated section of the software dealing with GPS data reception and processing. More detailed descriptions of specific FALCON® system 200 applications are disclosed in the '924 patent referenced above, as well as U.S. patent application Ser. No. 08/915,847 by Robert J. Monson, entitled INTELLIGENT MOBILE PRODUCT APPLICATION CONTROL SYSTEM, filed Dec. 13, 1995, and U.S. Pat. No. 5,757,640 by Robert J. Monson, entitled PRODUCT APPLICATION CONTROL WITH DISTRIBUTED PROCESS MANAGER FOR USE ON MACHINES, issued May 26, 1998, all incorporated by reference in their entirety herein.

As may be readily understood from FIG. 11, the delay coordinating system 50 acquires time delay data which is stored in a data base 904 as described above, and interacts with the FALCON® system 200 to automatically determine and implement the precise moments in time each metering device in the product flow stream is actuated, thereby further enabling the automation and enhancing the art of site-specific farming.

Figure 12:
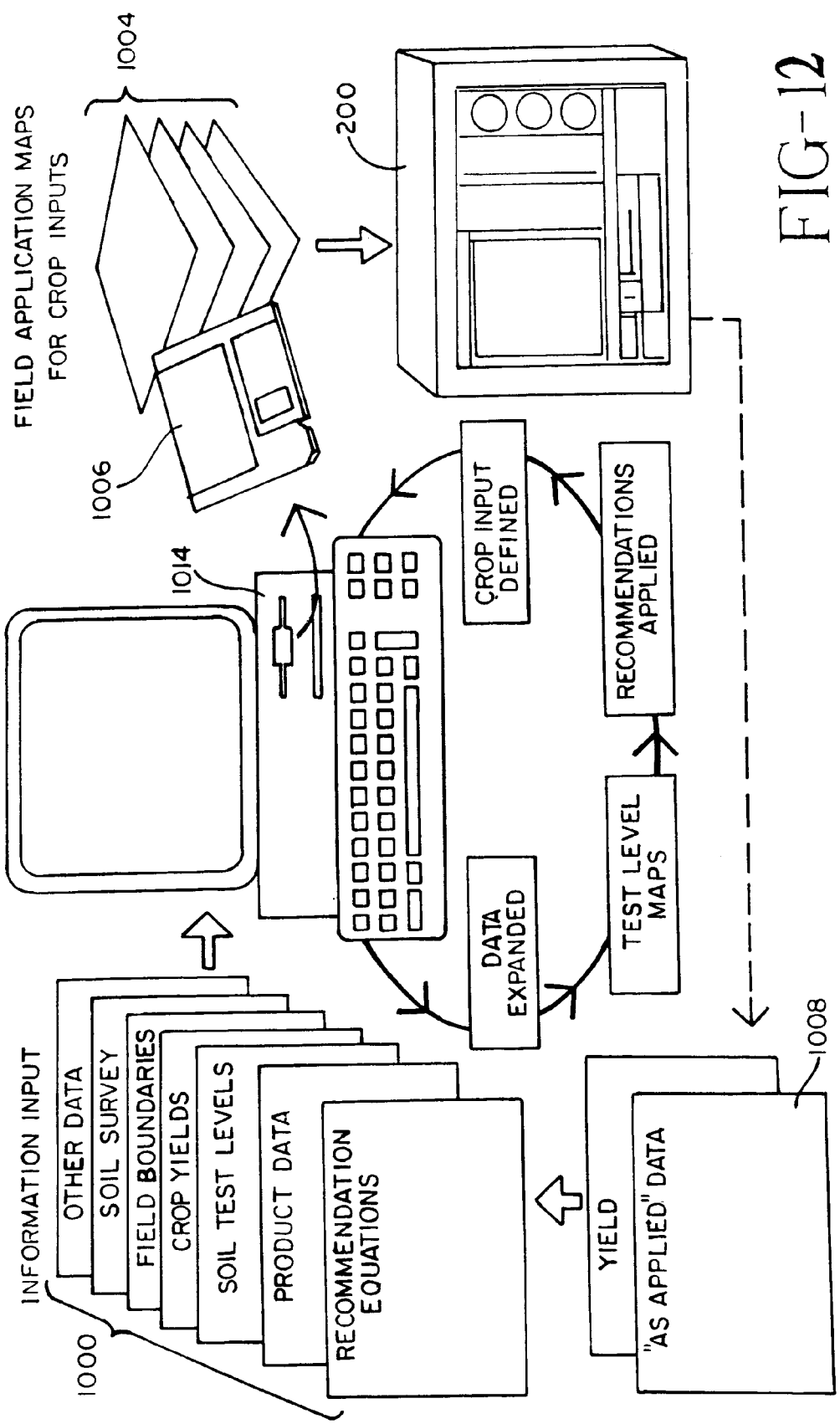
FIG. 12 is a pictorial diagram illustrating the flow of agronomic information into a FALCON® variable rate controller via SOILECTION® mapping algorithms.

FIG. 12 is a pictorial diagram illustrating the flow of agronomic information 1000 into a FALCON® variable rate controller 200 via SOILECTION® mapping algorithms. Agronomic information 1000, e.g. recommendation equations, product (crop input) data, soil test data, crop yield data, field boundary data, soil survey data, and other data are stored in a database within the computer system 1014. The agronomic information 1000 is manipulated via the aforesaid SOILECTION® mapping algorithms to yield digitized field application maps 1004 that are stored on a predetermined storage medium 1006. The digitized field application maps 1004 are transmitted to the FALCON® controller 200 along with the delay compensation data 524 to control operation of the mobile SOILECTION® vehicle 902. Additional information such as, but not limited to "as applied data" 1008 is then also added to the computer system 1014 database to further refine the agronomic information 1000 that may be used to create subsequent digitized field application maps 1004 for use by the SOILECTION® vehicle 902.

Figure 13:
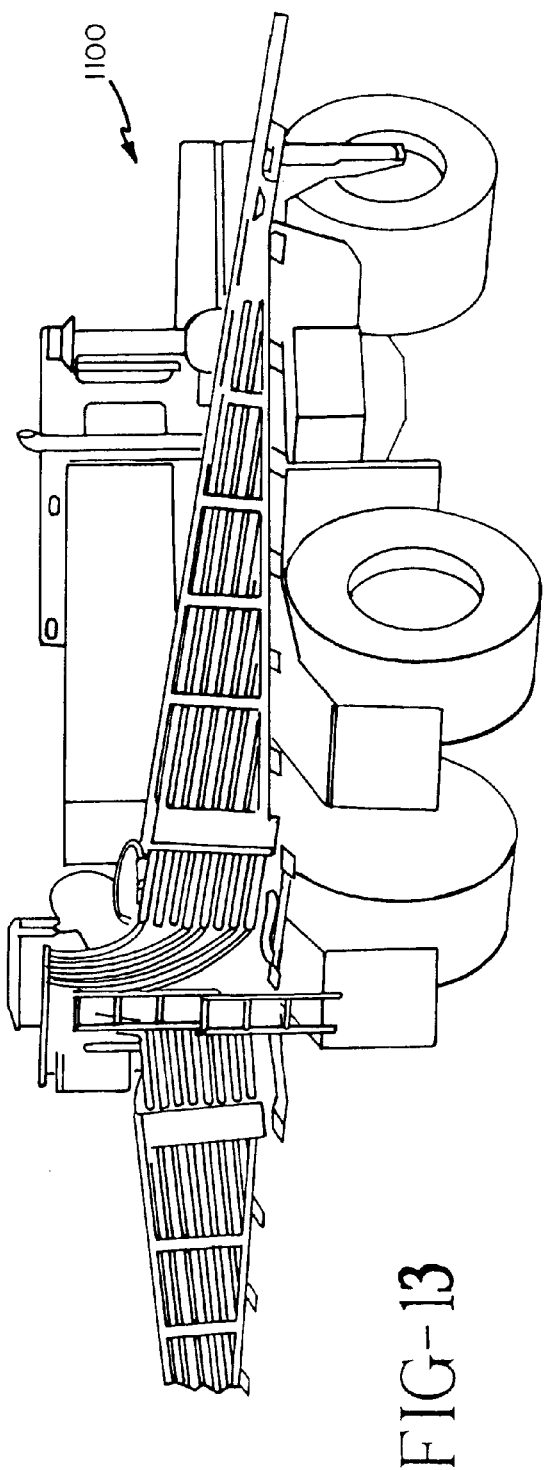
FIG. 13 shows a perspective view illustrating one embodiment of a single multi-bin product storage pneumatic application machine particularly suitable for use with the delay coordinating system depicted in FIG. 1.
Figure 14:
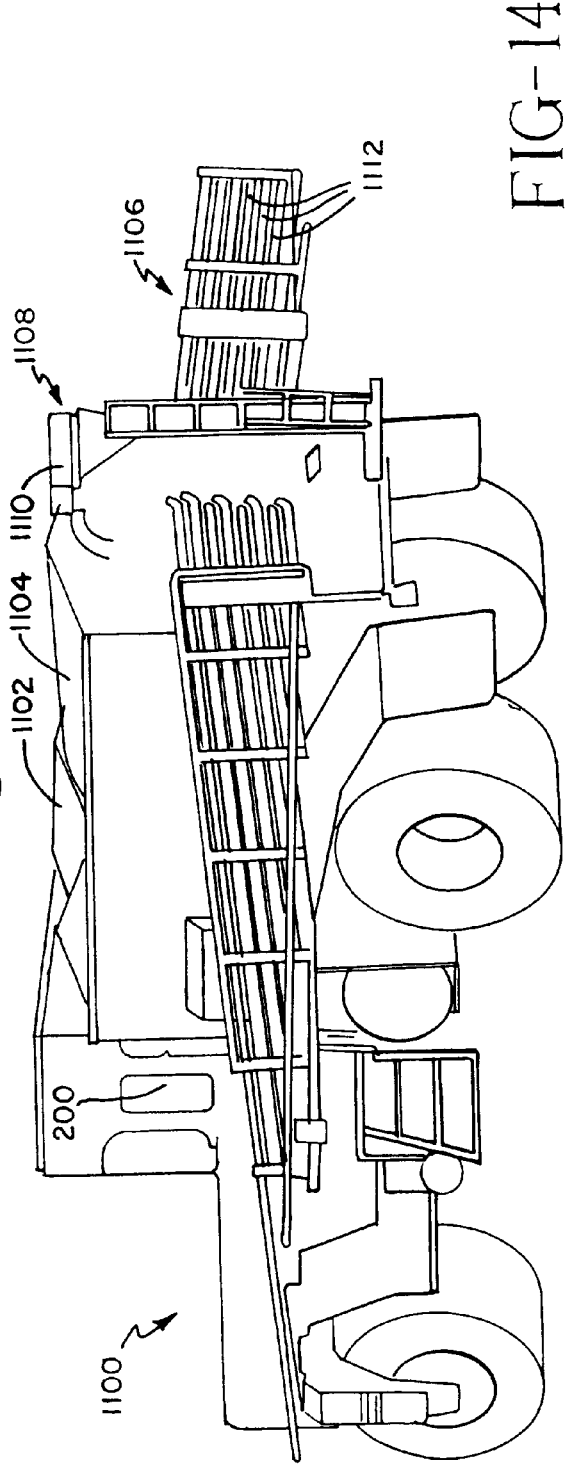
FIG. 14 is another perspective view illustrating the pneumatic application machine shown in FIG. 13.

FIGS. 13 and 14 show perspective views illustrating one embodiment of a single multi-bin product storage pneumatic application machine 1100 particularly suitable for use with the delay coordinating system 50 depicted in FIG. 1. The pneumatic application machine 1100 has two product storage bins 1102, 1104 and a pendulum mounted boom structure 1106 with truss type boom supports. An auger system 1108 transfers product that is stored in storage bins 1102, 1104 to a distributor head 1110 that distributes the desired amount of product to each pneumatic boom tube 1112 to achieve desired product dispensation rates and prescriptions. Each product storage bin 1102, 1104 is operably coupled to a granular bin metering system 60, 62, preferably having a separate meter screw (pump) 62 associated with each bin 1102, 1104. A FALCON® controller 200 responsive to the digitized field application maps 1004 and delay compensation data 524 discussed herein above is located inside the cab of the machine 1100 to control the individual actuators, e.g. 306 in FIG. 4, associated with the bin metering system 60, 62, auger system 1108 and distributor head 1110. The delay coordinating system 50 can then ensure the requisite set of actuators are activated and controlled at the necessary moments in time as the machine 1100 is traversing a field, to achieve precise application of agricultural products.

Figure 15:
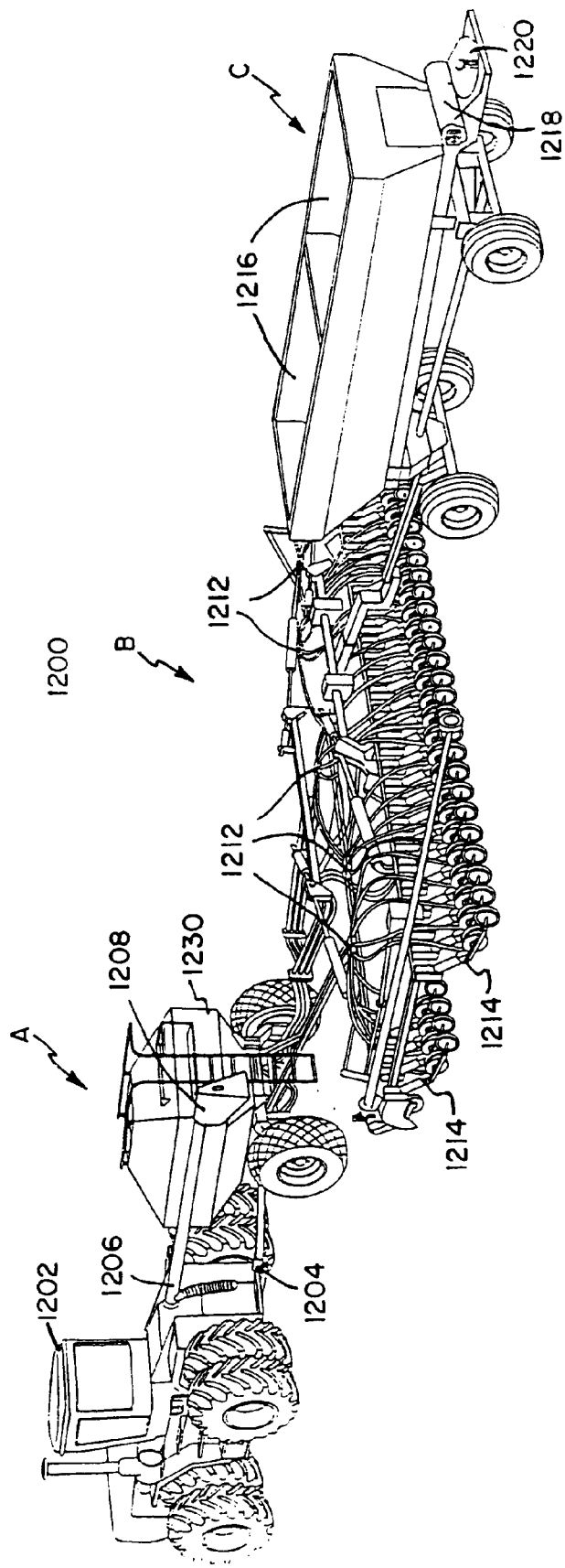
FIG. 15 is a perspective view illustrating a "mule-train" arrangement multiple product application system capable of carrying out site-specific application of multiple selected products when used in combination with the present delay coordinating system.
Figure 16:
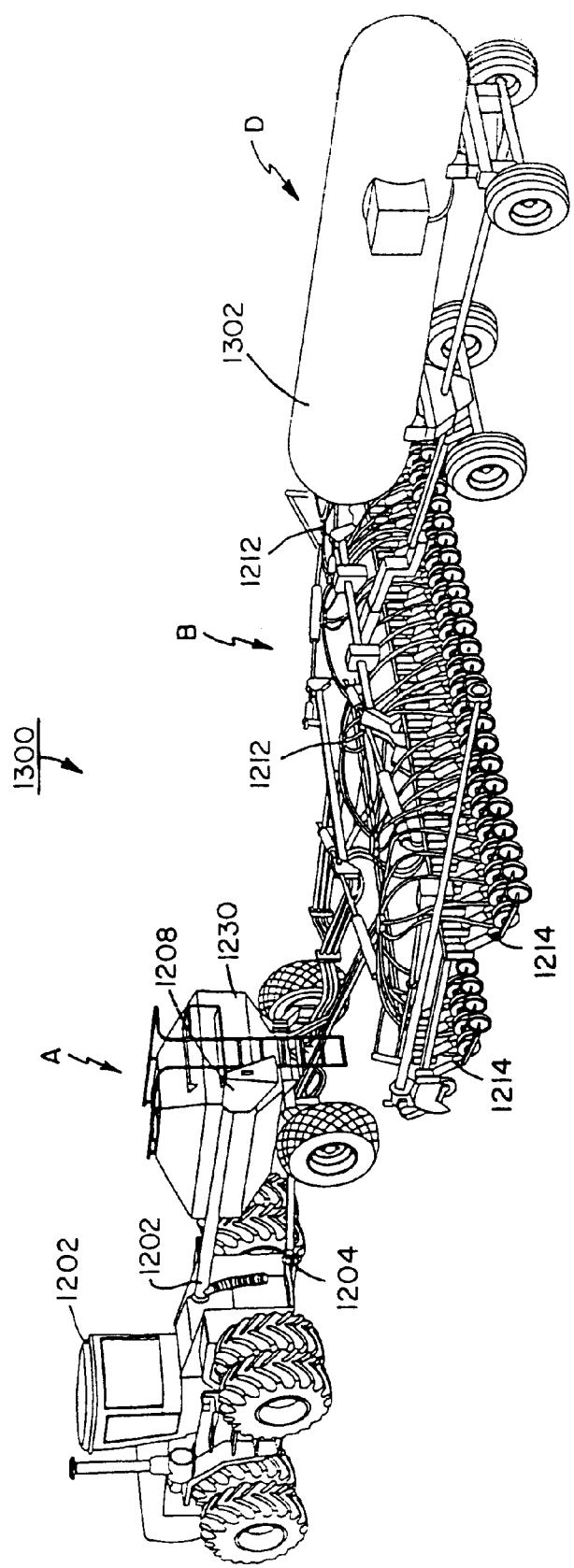
FIG. 16 is a perspective view illustrating another "mule-train" arrangement product application system capable of carrying out site-specific application of multiple selected products when used in combination with the present delay coordinating system.

FIGS. 15, 16 and 17 show perspective views illustrating a "mule-train" arrangement agricultural products application systems 1200, 1300 and 1400 capable of carrying out site-specific application of multiple selected products when used in combination with the present delay coordinating system 50 in accordance with one embodiment of the present invention. The application systems 1200, 1300 and 1400 include a towing vehicle 1202 such as a tractor or other like machine suitable for towing a plurality of operatively coupled crop input application machines (towed vehicles A, B, C in FIG. 15, towed vehicles A, B, and D in FIG. 16 and towed vehicles A and E in FIG. 17). The towing vehicle could just as well also be a crop input application vehicle such as a TERRA-GATOR® machine such as illustrated in FIGS. 13 and 14, with a fertilizer application system attached as manufactured by Ag-Chem Equipment Company, Inc. of Minnetonka, Minn. or a Lor*Al chassis with an Air-Max® system attached as manufactured by Lor*Al Products, Inc. of Benson, Minn., or any other type of variable rate crop input applicator machine, such as discussed herein above. With continued reference to FIGS. 15, 16 and 17, the towing vehicle 1202 can be seen to include a single point hitch 1204 and a variable speed drive mechanism 1206 coupled to at least one actuating device 1208 associated with a crop input storage tank/bin 1230 on vehicle A. The variable speed drive mechanism 1206 is configured to operate in cooperation with a plurality of crop input product metering devices 1212 and associated dispensing point devices 1214 such that the present delay coordinating system 50 can function in the manner described herein before to ensure that crop inputs stored within crop input storage tank/bin 1230 are dispensed to achieve the desired prescription and quantity of crop inputs based upon formerly measured conditions and values at each designated field reference point.

Vehicle B is coupled to vehicle A and carries product metering devices 1212 and associated dispensing point devices 1214. Vehicle B is, in different embodiments, a planter or a dry chemical dispenser, or alternatively a sprayer.

In like fashion, additional towed crop input storage bin(s) 1216 on vehicle C or tanks 1302 on vehicle D can be seen to form yet another portion of the "mule-train" application system 1200, 1300 to achieve desired prescriptions and quantities of crop inputs that are distinguishable from that achieved via products storage tank/bin 1230. In particular, the product storage bin(s) 1216 can be seen to include a product conveyor mechanism 1218 configured to deliver specified products to one or more spreader mechanisms 1220 associated with the storage bin(s) 1216. The speed and direction of the conveyor mechanism(s) 1218 are configured to function in coordination with the spreader mechanism(s) 1220 to achieve the desired prescription and quantity of product(s) applied via the product storage bin(s) 1216 when operated in combination with the present delay coordinating system 50 as described herein above. Looking again at FIG. 16, one embodiment of the "mule-train" application system 1300 can be seen to also have a towed product storage tank 1302. The product storage tank 1302 can be configured with its own unique metering and distribution system (not shown) or alternatively can be operatively coupled to the product metering devices 1212 and associated dispensing point devices 1214 on vehicle B such that the present delay coordinating system 50 can function in the manner described herein before to ensure that crop inputs stored within storage tank 1302 are dispensed to achieve the desired prescription and quantity of crop inputs. It is readily apparent that the application system 1200, 1300, 1400 can include single or multiple compartment tanks and/or bins or any combinations thereof. It will readily be appreciated that many other types and quantities of product storage devices and associated conveying, metering, dispensing and actuating devices can be added to the "mule-train" application systems 1200, 1300, 1400 to achieve desired prescriptions and quantities of predetermined applied products, both dry and liquid, as well as any combinations thereof. As stated herein before, the present delay coordinating system 50 is responsive to changes in soil and/or field conditions, topographical features, and/or characteristics such as nutrient levels, soil compaction, drainage or other qualifying crop production characteristics, which have been found by the present inventor, to sometimes occur even within a distance of a few feet. For example, it now is known that fertility levels are a lot like surface topography. Although the fertility levels cannot be seen, they still exist. Therefore, the importance of tighter control of crop input application has and will continue to become more relevant and necessary. The aforesaid changes in soil and/or field conditions, topographical features, and/or characteristics such as nutrient levels, soil compaction, drainage or other qualifying crop production characteristics are accounted for via one or more digitized soil maps stored within the present delay coordinating system 50, as discussed herein before. It will be appreciated that the present delay coordinating system 50, when integrated into a "mule-train" type site-specific applicator system 1200, 1300, 1400 is capable of taking into consideration the nature and type of crop inputs, nature and location of the individual machine crop input dispensing points employed, e.g. wet booms, dry booms, nozzles, conveyors, spinners, planters, drop tubes, air tubes, injectors, and the like, as well as the ground speed and direction of the machine to establish a system "signature" that is unique and specific to any particular "mule-train" site-specific crop input system. The aforesaid combination of features and characteristics of the present delay coordinating system 50 operate in harmony to also allow deposition of crop inputs to a geographic area in a fashion akin to "feathering." As used herein, feathering deposition of crop inputs is a characteristic feature of the present invention that can be defined as a gradual variation in the density and/or quantity of crop inputs applied between two or more field reference points.

The delay coordinating system can be used with an unlimited number of vehicles featuring various application systems or with a simple system shown in FIG. 17. In FIG. 17, towing vehicle 1202 is pulling Vehicle E, which represents planter 1402 being pulled with storage tank/bin 1230. This system could also be simplified to towing vehicle 1202 and Vehicle E. As with Vehicle B, Vehicle E is, in different embodiments, a planter or a dry chemical dispenser, or alternatively a sprayer.

When the present invention is operated in a "mule train" configuration such as illustrated in FIGS. 15, 16 and 17, the control system stores and uses information about the relative position of each vehicle (A, B, C, D, E) and the dispensing point devices carried by that vehicle with respect to the towing vehicle (which typically carries the GPS sensor). In that way, the different times of arrival of the various dispensing point devices at a given field location are taken into account.

This invention has been described herein in considerable detail in order to comply with the patent statutes and to provide those skilled in the art with the information needed to apply the novel principles and to construct and use such specialized components as are required. In view of the foregoing descriptions, it should be apparent that the present invention represents a significant departure from the prior art in construction and operation. Further it provides for improving the quality of crop yield and affords a more environmentally desirable approach to site specific fanning by eliminating or significantly reducing inaccuracies and imprecision during planting or application of other crop inputs to a field. However, while a particular embodiment of the present invention has been described herein in detail, it is to be understood that various alterations, modifications and substitutions can be made therein without departing from the spirit and scope of the present invention, as defined in the claims which follow. For example, it will be apparent to those skilled in the agricultural industry that although particular storage devices, crop input transport mechanisms, crop input release points and dispensing points have been illustrated, that many other storage devices, crop input transport mechanisms, release points and dispensing points will also work to provide the intended functions of accurately compensating for multiple time delays onboard one or more operably coupled variable rate multiple crop input application machines which affect the accuracy of product delivery to an anticipated reference point in a field being traversed by the variable rate operably coupled spreading or product application machine(s). It will also be understood that the present invention will also work with any multiple combination of powered and/or towed crop input variable rate, multiple product applicator machines including side-by-side combinations and tandem combinations, to ensure a desired prescription and quantity of crop inputs or planting products, e.g. seeds, is delivered to each designated field point based upon formerly measured conditions and values at that designated field point, as the multiple combination of operably coupled crop input applicator machines traverse a field to be treated.

Although the present invention has been described with reference to preferred embodiments, workers skilled in the art will recognize that changes may be made in form and detail without departing from the spirit and scope of the invention.

What is claimed is:

1. An agricultural system for application of crop inputs to a field, the system comprising:
   a first vehicle;
   a first crop input dispensing system having a plurality of crop input dispensing points, each dispensing point associated with the first vehicle and having a characteristic dispensing delay time;
   a first positioning system for determining position of the first vehicle in the field; and
   a control system for controlling operation of the first crop input dispensing system as a function of position of the first vehicle in the field, a map which defines desired crop inputs for various positions in the field, and the characteristic dispensing delay time for each of the dispensing points associated with the first vehicle.

2. The system of claim 1 wherein the characteristic dispensing delay time of each dispensing point is a time between initiating flow of the crop inputs and dispensing of the crop inputs from the dispensing point.

3. The system of claim 1 and further comprising an actuator operatively coupled to each crop input release point.

4. The system of claim 1 wherein the first vehicle is self-propelled.

5. The system of claim 1 wherein the first vehicle is equipped for towing a second vehicle.

6. The system of claim 1 and further comprising a data input device in communication with the control system.

7. The system of claim 1 and further comprising:
   a second vehicle;
   a second crop input dispensing system having a plurality of crop input dispensing points, each dispensing point associated with the second vehicle and having a characteristic dispensing delay time wherein the operation of the second crop input dispensing system is controlled by the control system as a function of the map which defines desired crop inputs for various positions, and the characteristic dispensing delay time for each of the dispensing points associated with the second vehicle.

8. The system of claim 7 wherein the control system also controls operation of the second crop dispensing system as a function of relative positions of the first and second vehicles.

9. The system of claim 7 and further comprising:
   a third vehicle;
   a third crop input dispensing system having a plurality of crop input dispensing points, each dispensing point associated with the third vehicle and having a characteristic dispensing delay time wherein the operation of the third crop input dispensing system is controlled by the control system as a function of the map which defines desired crop inputs for various positions, and the characteristic dispensing delay time for each of the dispensing points associated with the third vehicle.

10. An agricultural system for application of seeds to a field, the system comprising:
    a planter;
    a seed dispensing system having a plurality of seed dispensing points, each dispensing point associated with the planter and having a characteristic dispensing delay time;
    a positioning system for determining the position of the planter in the field; and
    a control system for controlling operation of the seed dispensing system as a function of position of the planter in the field, a map which defines an amount of seed desired for various positions in the field, and the characteristic dispensing delay time for each of the dispensing points.

11. The system of claim 10 wherein the characteristic dispensing delay time of each dispensing point is a time between initiating flow of the seeds and dispensing of the seeds from the dispensing point.

12. The system of claim 10 and further comprising an actuator operatively coupled to each seed release point.

13. The system of claim 10 wherein the planter is associated with a self-propelled vehicle.

14. The system of claim 10 wherein the planter is equipped for towing.

15. An agricultural system for application of dry chemicals to a field, the system comprising:
   a spreader;
   a dry chemical dispensing system having a plurality of dry chemical dispensing points, each dispensing point associated with the spreader and having a characteristic dispensing delay time;
   a positioning system for determining the position of the spreader in the field; and
   a control system for controlling operation of the dry chemical dispensing system as a function of position of the spreader in the field, a map which defines an amount of dry chemical desired for various positions in the field, and the characteristic dispensing delay time for each of the dispensing points.

16. The system of claim 15 wherein the characteristic dispensing delay time of each dispensing point is a time between initiating flow of the dry chemicals and dispensing of the dry chemicals from the dispensing point.

17. The system of claim 15 and further comprising an actuator operatively coupled to each dry chemical release point.

18. The system of claim 15 wherein at least one spreader is associated with a self-propelled vehicle.

19. The system of claim 15 wherein at least one spreader is equipped for towing.

20. An agricultural system for application of liquid chemicals to a field, the system comprising:
   a sprayer;
   a liquid chemical dispensing system having a plurality of liquid chemical dispensing points, each dispensing point associated the sprayer and having a characteristic dispensing delay time;
   a positioning system for determining the position of the sprayer in the field; and
   a control system for controlling operation of the liquid chemical dispensing system as a function of position of the sprayer in the field, a map which defines an amount of liquid chemical desired for various positions in the field, and the characteristic dispensing delay time for each of the dispensing points.

21. The system of claim 20 wherein the characteristic dispensing delay time of each dispensing point is a time between initiating flow of the liquid chemicals and dispensing of the liquid chemicals from the dispensing point.

22. The system of claim 20 and further comprising an actuator operatively coupled to each liquid chemical release point.

23. The system of claim 20 wherein the sprayer is associated with a self-propelled vehicle.

24. The system of claim 20 wherein the sprayer is equipped for towing.

25. An agricultural system for application of crop inputs to a field, the system comprising:
   a plurality of vehicles;
   a crop input dispensing system having a plurality of crop input dispensing points, each dispensing point associated with the plurality of vehicles and having a characteristic dispensing delay time;
   a positioning system for determining the position of the plurality of vehicles in the field; and
   a control system for controlling operation of the crop input dispensing system as a function of position of the plurality of vehicles in the field, a map which defines desired crop inputs for various positions in the field, and the characteristic dispensing delay time for each of the dispensing points, such that a desired prescription and quantity of crop inputs is delivered to an exact field point as the plurality of vehicles traverse the field.

26. The system of claim 25 wherein the characteristic dispensing delay time of each dispensing point is a time between initiating flow of the crop inputs and dispensing of the crop inputs from the dispensing point.

27. The system of claim 25 wherein at least one vehicle is self-propelled.

28. The machine of claim 25 wherein at least one vehicle is equipped for towing.

29. The system of claim 25 and further comprising a data input device in communication with the control system.

30. A method of dispensing agricultural crop inputs to a field, the method comprising:
   providing a vehicle;
   providing a crop input dispensing system having a plurality of crop input dispensing points, each dispensing point associated with the vehicle and having a characteristic dispensing delay time between initiating flow of the crop inputs and dispensing the crop inputs;
   determining the position of the vehicle as it traverses a field; and
   utilizing the position of the vehicle, a map which defines desired crop inputs for various positions in the field, and the characteristic dispensing delay time for each dispensing point to control the operation of the crop input dispensing system, such that a desired prescription and quantity of crop inputs is delivered to an exact field point as at the vehicle traverses the field.

* * * * *